United States Patent
Nishi et al.

(10) Patent No.: US 8,368,854 B2
(45) Date of Patent: Feb. 5, 2013

(54) LIQUID CRYSTAL DISPLAY DEVICE AND METHOD FOR MANUFACTURING THE SAME

(75) Inventors: Takeshi Nishi, Kanagawa (JP); Tetsuji Ishitani, Kanagawa (JP); Daisuke Kubota, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 407 days.

(21) Appl. No.: 12/724,614

(22) Filed: Mar. 16, 2010

(65) Prior Publication Data

US 2010/0245724 A1    Sep. 30, 2010

(30) Foreign Application Priority Data

Mar. 26, 2009 (JP) ................................. 2009-076090

(51) Int. Cl.
*G02F 1/1335* (2006.01)
(52) U.S. Cl. ....................................................... 349/112
(58) Field of Classification Search .................... 349/112
See application file for complete search history.

(56) References Cited

U.S. PATENT DOCUMENTS

| | | | |
|---|---|---|---|
| 4,767,194 A * | 8/1988 | Heppke et al. | 349/167 |
| 7,576,829 B2 | 8/2009 | Kikuchi et al. | |
| 2001/0046009 A1 * | 11/2001 | Hatano et al. | 349/86 |
| 2008/0259254 A1 | 10/2008 | Kikuchi et al. | |

FOREIGN PATENT DOCUMENTS

| | | |
|---|---|---|
| EP | 1 743 931 A1 | 1/2007 |
| WO | WO 2005/090520 A1 | 9/2005 |

* cited by examiner

*Primary Examiner* — Phu Vu
(74) *Attorney, Agent, or Firm* — Nixon Peabody LLP; Jeffrey L. Costellia

(57) ABSTRACT

An object is to provide a highly reliable liquid crystal display device which includes a liquid crystal layer exhibiting a more stable blue phase. Another object is to provide a method for manufacturing a liquid crystal display device with high yield. Polymer stabilization treatment is performed as follows: a photocurable resin is added to a liquid crystal material exhibiting a blue phase, and the photocurable resin is selectively polymerized by scanning a liquid crystal layer provided between a first substrate and a second substrate with light in a certain direction. Thus, a first region where the light irradiation treatment is performed and a second region where the light irradiation treatment is not performed are formed in the liquid crystal layer. Since polymerization of the photocurable resin proceeds in the first region, the polymerization degree of the photocurable resin in the first region is higher than that in the second region.

18 Claims, 11 Drawing Sheets

FIG. 2A1
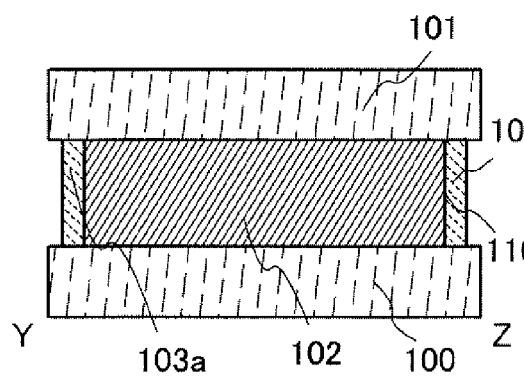
FIG. 2A2
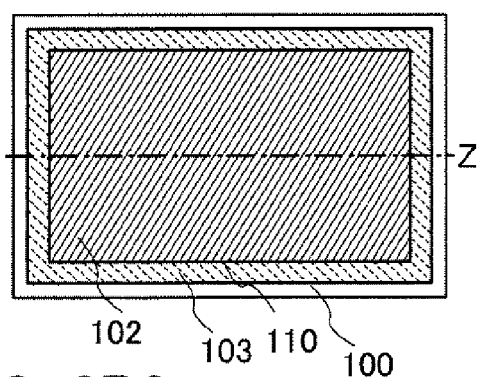
FIG. 2B1
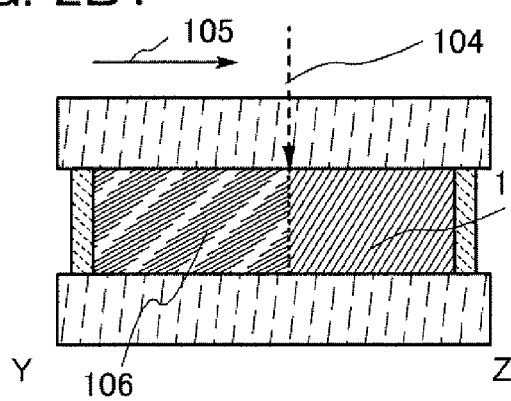
FIG. 2B2
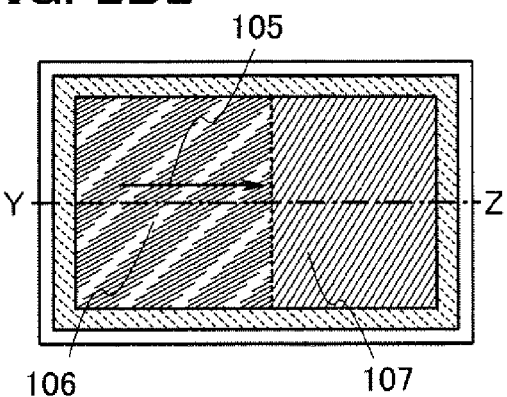
FIG. 2C1
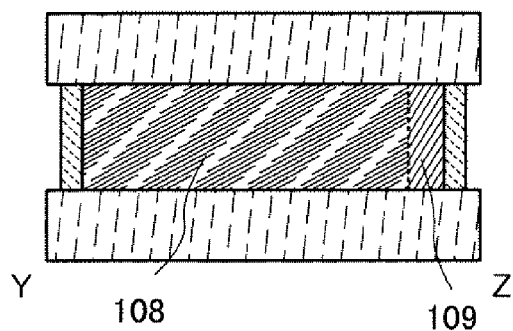
FIG. 2C2
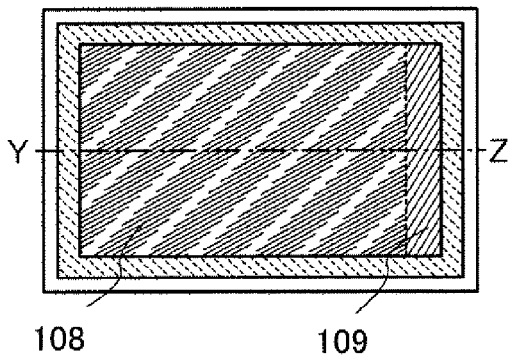

FIG. 4A1
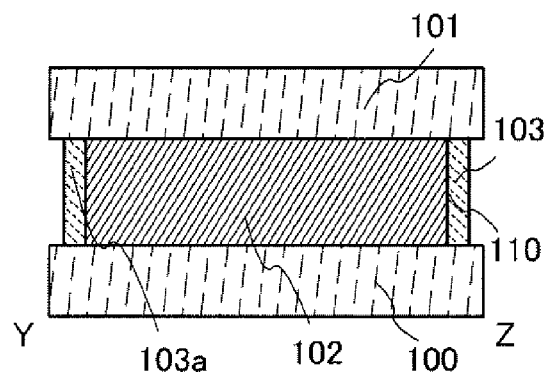
FIG. 4A2
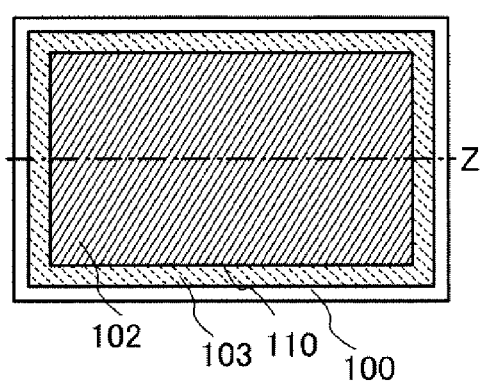
FIG. 4B1
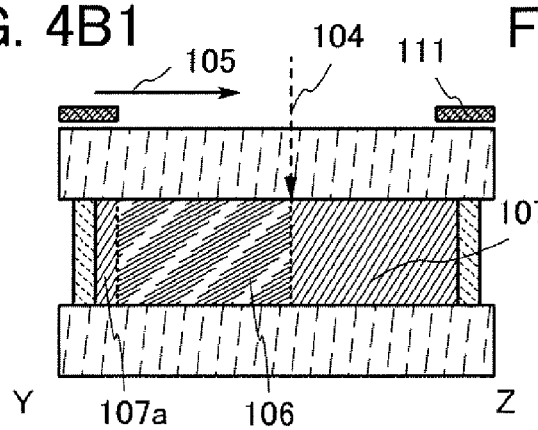
FIG. 4B2
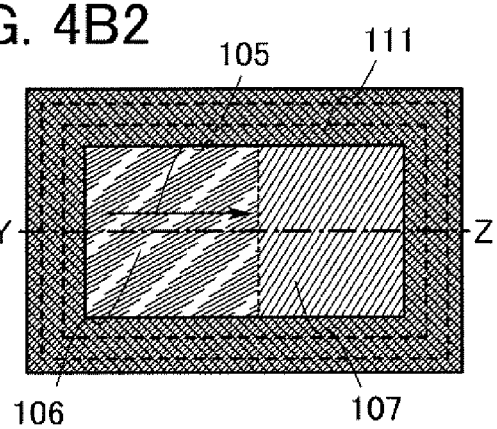
FIG. 4C1
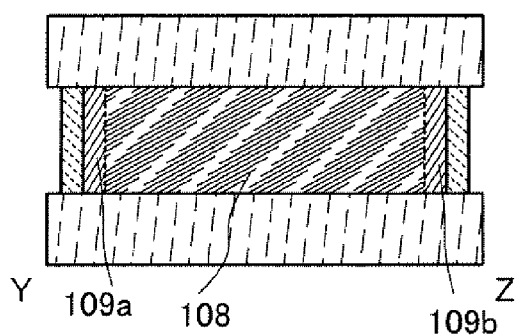
FIG. 4C2
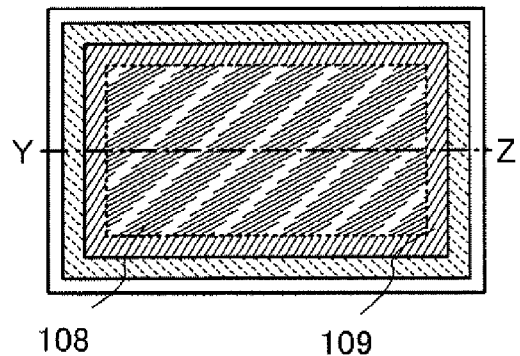

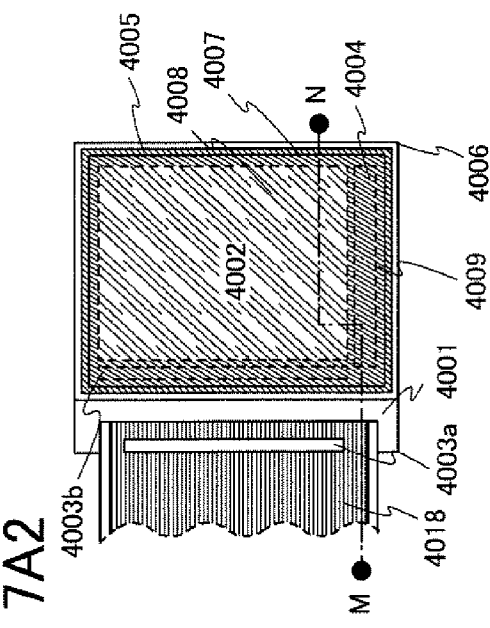
FIG. 7A1
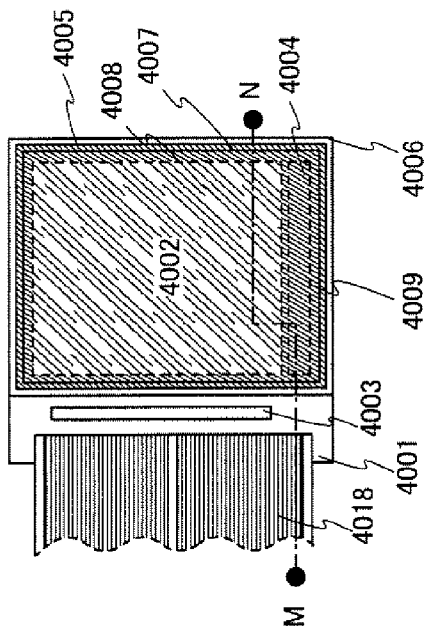
FIG. 7A2
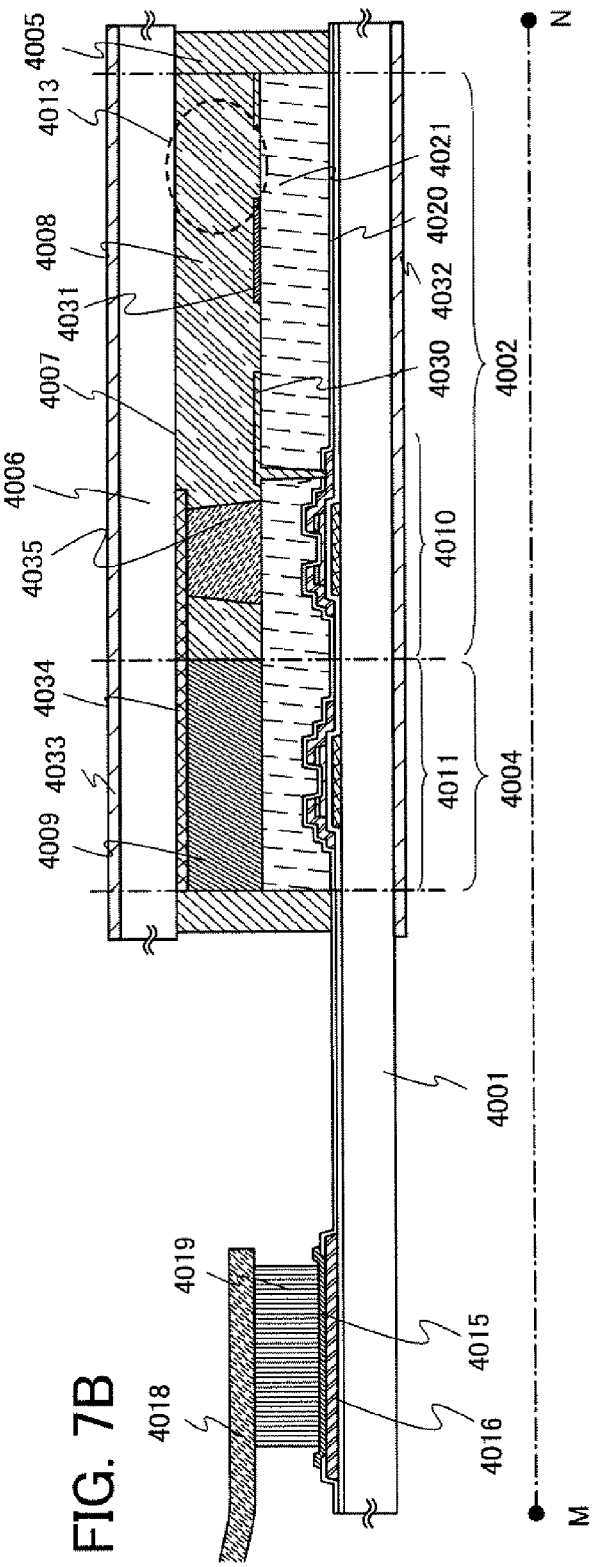
FIG. 7B

LIQUID CRYSTAL DISPLAY DEVICE AND METHOD FOR MANUFACTURING THE SAME

BACKGROUND OF THE INVENTION

1. Field of the Invention

The present invention relates to a liquid crystal display device and a method for manufacturing the liquid crystal display device.

2. Description of the Related Art

As a display device which is thin and lightweight (a so-called flat panel display), a liquid crystal display device including a liquid crystal element, a light-emitting device including a self light-emitting element, a field emission display (FED), and the like have been competitively developed.

In a liquid crystal display device, response speed of liquid crystal molecules is required to be increased. Among various kinds of display modes of a liquid crystal, a ferroelectric liquid crystal (FLC) mode, an optical compensated birefringence (OCB) mode, and a mode using a liquid crystal exhibiting a blue phase can be given as liquid crystal modes by which high-speed response is possible.

In particular, the mode using a liquid crystal exhibiting a blue phase does not require an alignment film and the viewing angle can be widened; therefore, further research thereon has been carried out for practical use (see Patent Document 1, for example). Patent Document 1 is a report that polymer stabilization treatment is performed on a liquid crystal to widen a temperature range in which a blue phase appears.

REFERENCE

[Patent Document 1] PCT International Publication No. 05/090520

SUMMARY OF THE INVENTION

Polymer stabilization treatment is treatment performed in such a manner that a photocurable resin is added to a liquid crystal material and the photocurable resin is polymerized with light so that a liquid crystal layer is stabilized. However, it is difficult to polymerize a photocurable resin uniformly in a large-sized substrate surface. When polymerization of high molecules is not uniform, alignment in a liquid crystal layer is not uniform, either. Accordingly, a stable blue phase cannot be obtained.

Therefore, it is an object to provide a highly reliable liquid crystal display device which includes a liquid crystal layer exhibiting a more stable blue phase and a method for manufacturing the liquid crystal display device.

Polymer stabilization treatment is performed in the following manner: a photocurable resin is added to a liquid crystal material exhibiting a blue phase, and then the photocurable resin is selectively polymerized by scanning a liquid crystal layer provided between a first substrate and a second substrate, with a light irradiation means in a certain direction. Thus, a region (also referred to as a first region) where the light irradiation treatment is performed and a region (also referred to as a second region) where the light irradiation treatment is not performed are formed in the liquid crystal layer. Since polymerization of the photocurable resin proceeds in the first region, the polymerization degree of the photocurable resin in the first region is higher than that in the second region.

In this specification, in the liquid crystal layer, the region where the light irradiation treatment is performed and the polymerization degree of the photocurable resin is increased is referred to as a high polymerization region. On the contrary, the region where the light irradiation treatment is not performed and the polymerization degree of the photocurable resin is lower than that of the region where the polymerization degree of the photocurable resin is increased is referred to as a low polymerization region. In addition, a mixture of the liquid crystal material and the photocurable resin, which is used for the liquid crystal layer, is also referred to as a liquid crystal mixture (a liquid crystal composition).

The first substrate and the second substrate are bonded (attached) to each other by a sealant, and the liquid crystal layer is provided in a region surrounded by the sealant. A liquid crystal mixture in the vicinity of the sealant and a liquid crystal mixture (also referred to as a liquid crystal mixture in a display region) which is in a central portion apart from the sealant are different in the polymerization degree of the photocurable resin by light irradiation. Therefore, if the light irradiation treatment is performed on an entire region of the liquid crystal layer (the region in the vicinity of the sealant and the display region), alignment of the liquid crystal mixture varies due to differences in the polymerized state of the photocurable resin, between the region in the vicinity of the sealant and the display region. Accordingly, nonuniform alignment is caused in the liquid crystal layer; for example, a blue phase is exhibited in the display region, whereas the blue phase is not exhibited in the region in the vicinity of the sealant. Thus, a display defect is caused.

In order to reduce extreme differences in alignment between the region in the vicinity of the sealant and the display region due to the light irradiation treatment, the vicinity of the sealant is, intentionally, not subjected to the light irradiation treatment so as to be a low polymerization region. Since the vicinity of the sealant is the low polymerization region, extreme change in the polymerization degree of the photocurable resin can be reduced. Accordingly, a stable blue phase can be obtained in a larger region of the liquid crystal layer.

Polymer stabilization treatment is performed by polymerization reaction of a photocurable resin due to light irradiation treatment. As a method for selectively performing the light irradiation treatment, the following method is employed: light irradiation treatment is performed by scanning the liquid crystal layer in a certain direction with a light irradiation means with which the light irradiation treatment can be performed on part of the liquid crystal layer, not on the entire region of the liquid crystal layer at one time. Here, the liquid crystal layer may be scanned relative to light; therefore, the light irradiation means may be moved, or a substrate over which the liquid crystal layer is formed may be moved.

A light irradiation region which can be irradiated with light at one time preferably has a linear (rectangular) shape, and the linear light irradiation region is preferably longer than a side of the substrate, which is parallel to the linear light irradiation region, for improvement in throughput. For example, the liquid crystal layer is irradiated with linear light under the condition where the light irradiation region is longer than a side of a rectangular substrate, and scanned in a direction perpendicular to the linear light irradiation region. Different from the case of light irradiation at one time, the region scanned with light is controlled, whereby a low polymerization region where the liquid crystal layer is not irradiated with light can be formed.

The above linear light irradiation region may be formed by linearly arranging a plurality of light sources or by processing irradiation light from a light source with an optical system.

Further, the shape of the light irradiation region in the liquid crystal layer may be rectangular, circular, elliptical, or the like instead of linear. In addition, as the irradiation light, lamp light from a lamp light source, laser light from a laser light source, or the like can be used. Light having a wavelength and energy with which polymerization reaction of the photocurable resin occurs may be selected as appropriate.

The light irradiation treatment which is the polymer stabilization treatment may be performed while the liquid crystal layer is heated. The heat treatment may also be performed selectively on only the high polymerization region in a manner similar to that of the light irradiation treatment.

Since light irradiation treatment of regions of the liquid crystal layer is performed at times different for each of the regions, so that polymerization of the photocurable resin proceeds in a certain direction, shape defects such as cracks due to rapid change in the condition of the liquid crystal layer can be reduced.

Since the light irradiation treatment is performed with the light irradiation means moving, even a large-sized substrate can be treated. Thus, a uniform and stable blue phase can be obtained.

Accordingly, a highly reliable liquid crystal display device which includes a liquid crystal layer exhibiting a stable blue phase can be manufactured. In addition, yield in manufacture is increased.

A liquid crystal material exhibiting a blue phase is used for the liquid crystal layer. The liquid crystal material exhibiting a blue phase has a short response time of 1 msec or less and enables high-speed response, whereby the liquid crystal display device can have higher performance.

The liquid crystal material exhibiting a blue phase includes a liquid crystal and a chiral agent. The chiral agent is employed to align the liquid crystal in a helical structure and to make the liquid crystal to exhibit a blue phase. For example, a liquid crystal material into which a chiral agent is mixed at 5 wt % or more may be used for the liquid crystal layer.

As the liquid crystal, a thermotropic liquid crystal, a low-molecular liquid crystal, a high-molecular liquid crystal, a ferroelectric liquid crystal, an anti-ferroelectric liquid crystal, or the like is used.

As the chiral agent, a material having a high compatibility with a liquid crystal and a strong twisting power is used. Either one of two enantiomers, R and S, is used, and a racemic mixture in which R and S are mixed at 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are seen in a liquid crystal material having a cholesteric phase or a smectic phase with a relatively short helical pitch of less than or equal to 500 nm. The alignment of the liquid crystal material has a double twist structure. Having the order of less than or equal to an optical wavelength, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

Since the blue phase is exhibited only in a narrow temperature range, a photocurable resin and a photopolymerization initiator are added to a liquid crystal material and polymer stabilization treatment is performed in order to widen the temperature range. The polymer stabilization treatment is performed in such a manner that a liquid crystal material including a liquid crystal, a chiral agent, a photocurable resin, and a photopolymerization initiator is irradiated with light having a wavelength with which the photocurable resin and the photopolymerization initiator react. This polymer stabilization treatment may be performed by irradiating a liquid crystal material exhibiting an isotropic phase with light, or by irradiating a liquid crystal material exhibiting a blue phase under the control of the temperature, with light.

For example, the polymer stabilization treatment is performed in the following manner: the temperature of the liquid crystal layer is controlled and under the state in which the blue phase is exhibited, the liquid crystal layer is irradiated with light. However, the polymer stabilization treatment is not limited to this manner and may be performed in such a manner that a liquid crystal layer under the state of exhibiting an isotropic phase at a temperature within +10° C., preferably +5° C. of the phase transition temperature between the blue phase and the isotropic phase is irradiated with light. The phase transition temperature between the blue phase and the isotropic phase is a temperature at which the phase changes from the blue phase to the isotropic phase when the temperature rises, or a temperature at which the phase changes from the isotropic phase to the blue phase when the temperature decreases. As an example of the polymer stabilization treatment, the following method can be employed: after heating a liquid crystal layer to exhibit the isotropic phase, the temperature of the liquid crystal layer is gradually decreased so that the phase changes to the blue phase, and then, irradiation with light is performed while the temperature at which the blue phase is exhibited is kept. Alternatively, after the phase changes to the isotropic phase by gradually heating a liquid crystal layer, the liquid crystal layer can be irradiated with light under a temperature within +10° C., preferably +5° C. of the phase transition temperature between the blue phase and the isotropic phase (under the state of exhibiting an isotropic phase). In the case of using an ultraviolet curable resin (a UV curable resin) as a photocurable resin included in the liquid crystal material, the liquid crystal layer may be irradiated with ultraviolet rays. Even in the case where the blue phase is not exhibited, if polymer stabilization treatment is performed by irradiation with light under a temperature within +10° C., preferably +5° C. of the phase transition temperature between the blue phase and the isotropic phase (under the state of exhibiting an isotropic phase), the response time can be made as short as 1 msec or less and high-speed response is possible.

One embodiment of a structure of the invention disclosed in this specification includes a first substrate and a second substrate which are bonded to each other by a sealant with a liquid crystal layer that includes a photocurable resin and a liquid crystal material exhibiting a blue phase interposed therebetween; and a first region and a second region which are included in the liquid crystal layer, wherein the polymerization degree of the photocurable resin in the first region is higher than that in the second region.

Another embodiment of a structure of the invention disclosed in this specification includes a first substrate and a second substrate which are bonded to each other by a sealant with a liquid crystal layer that includes a photocurable resin and a liquid crystal material exhibiting a blue phase interposed therebetween; and a first region and a second region that is in contact with the sealant, which are included in the liquid crystal layer, wherein the polymerization degree of the photocurable resin in the first region is higher than that in the second region.

In the above structure, it is preferable that the high polymerization region (the first region) where the polymer stabilization treatment is performed be a pixel region serving as a display region and that the low polymerization region (the second region) be a driver circuit region which does not contribute to display.

In another embodiment of a structure of the invention disclosed in this specification, a first substrate and a second substrate are bonded to each other by a sealant with a liquid crystal layer that includes a photocurable resin and a liquid crystal material exhibiting a blue phase interposed therebetween, and light irradiation treatment is selectively performed on the liquid crystal layer to form a first region and a second region. In the liquid crystal layer, the polymerization degree of the photocurable resin in the first region is higher than that in the second region, and the light irradiation treatment is performed by scanning the liquid crystal layer with light in a certain direction.

In another embodiment of a structure of the invention disclosed in this specification, a first substrate and a second substrate are bonded to each other by a sealant with a liquid crystal layer that includes a photocurable resin and a liquid crystal material exhibiting a blue phase interposed therebetween, and light irradiation treatment is selectively performed on the liquid crystal layer while the liquid crystal layer is heated to form a first region and a second region. In the liquid crystal layer, the polymerization degree of the photocurable resin in the first region is higher than that in the second region, and the light irradiation treatment is performed by scanning the liquid crystal layer with light in a certain direction.

In the light irradiation treatment, a surface of the liquid crystal layer may be irradiated from an oblique direction. The oblique irradiation can make a difference in energy supplied to the irradiation region. Alternatively, a plurality of lights supplying different energies may be used, and the liquid crystal layer may be irradiated with the plurality of lights in the order of increasing energy, starting from light which supplies the lowest energy to the liquid crystal layer. Further, in the light irradiation treatment, a plurality of irradiation means may be provided so that not one surface of the liquid crystal layer but both surfaces thereof are irradiated (both from the first substrate side and the second substrate side).

Note that the ordinal numbers such as "first" and "second" in this specification are used for convenience and do not denote the order of steps and the stacking order of layers. In addition, the ordinal numbers in this specification do not denote particular names which specify the present invention.

In this specification, a semiconductor device generally means a device which can function by utilizing semiconductor characteristics, and electro-optical devices, semiconductor circuits, and electronic devices are all semiconductor devices.

A highly reliable liquid crystal display device which includes a liquid crystal layer exhibiting a stable blue phase can be manufactured. In addition, yield in manufacture is increased.

BRIEF DESCRIPTION OF THE DRAWINGS

In the accompanying drawings:

FIGS. 2A1, 2A2, 2B1, 2B2, 2C1, and 2C2 are views illustrating a method for manufacturing a liquid crystal display device;

FIGS. 4A1, 4A2, 4B1, 4B2, 4C1, and 4C2 are views illustrating a method for manufacturing a liquid crystal display device;

FIGS. 7A1, 7A2, and 7B are views illustrating liquid crystal display devices;

DETAILED DESCRIPTION OF THE INVENTION

Figure 1A:
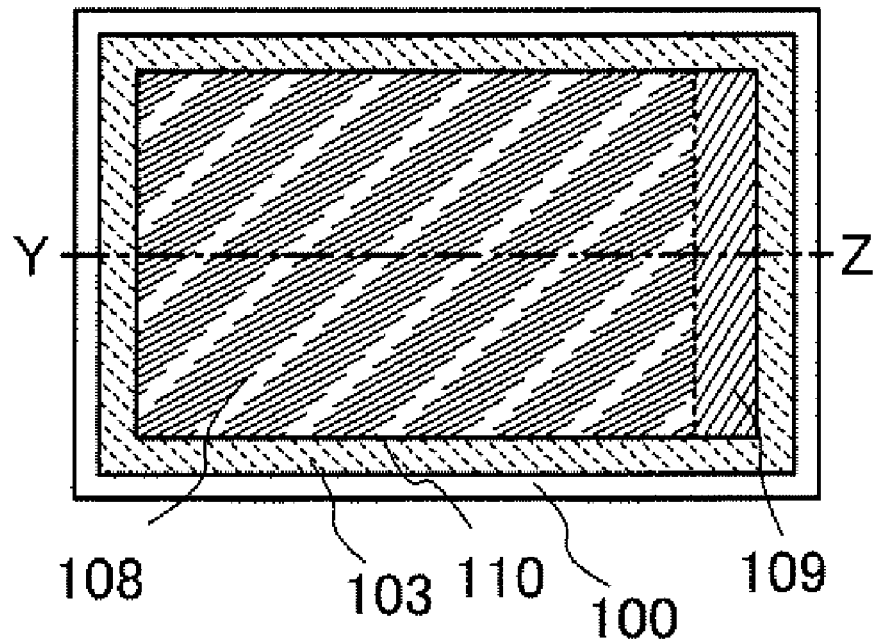
FIGS. 1A and 1B are views illustrating a liquid crystal display device.

Embodiments will be described in detail with reference to drawings. However, the present invention is not limited to the description below, and it is easily understood by those skilled in the art that the modes and details herein disclosed can be variously modified without departing from the scope and the spirit of the present invention. Therefore, the present invention should not be interpreted as being limited to the description of the embodiments below. In the structures described below, the same portions or portions having similar functions are denoted by the same reference numerals in different drawings, and repetitive description thereof will be omitted.

Embodiment 1

A liquid crystal display device will be described with reference to FIGS. 1A and 1B and FIGS. 2A1, 2A2, 2B1, 2B2, 2C1, and 2C2.

Figure 1B:
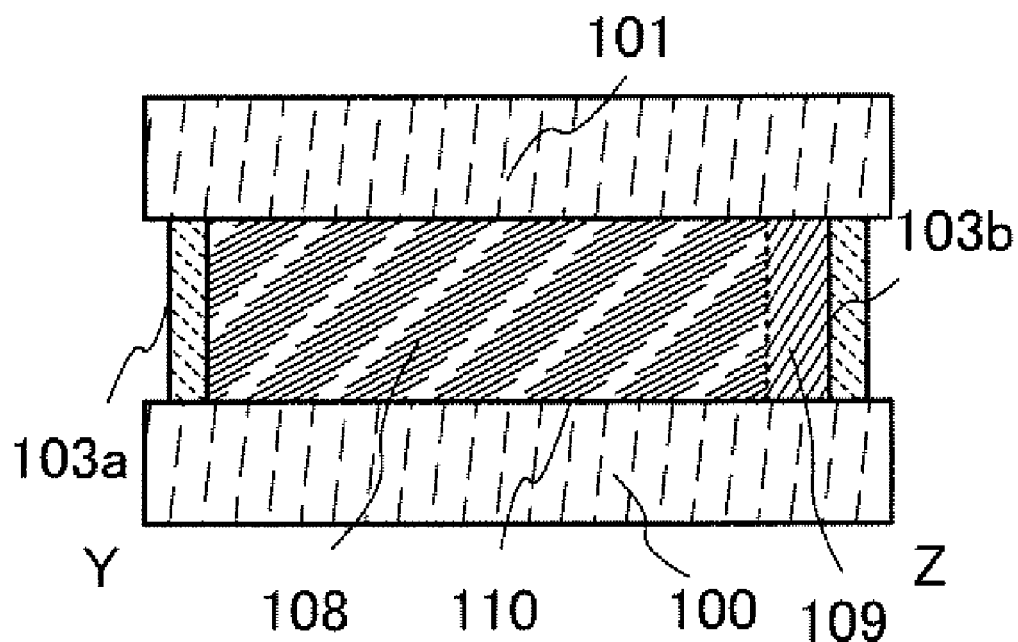

FIG. 1A illustrates a plan view of a liquid crystal display device, and FIG. 1B is a cross-sectional view taken along line Y-Z in FIG. 1A.

A first substrate 100 and a second substrate 101 are bonded (attached) to each other by a sealant 103 (103a and 103b). A liquid crystal layer 110 is provided between the first substrate 100 and the second substrate 101. The liquid crystal layer 110 includes a photocurable resin and a liquid crystal material exhibiting a blue phase. In the liquid crystal layer 110, a high polymerization region 108 refers to a region (a first region) where light irradiation treatment of the photocurable resin is performed as polymer stabilization treatment, and a low polymerization region 109 refers to a region (a second region) where the light irradiation treatment is not performed.

FIGS. 2A1, 2A2, 2B1, 2B2, 2C1, and 2C2 illustrate a method for manufacturing the liquid crystal display device in FIGS. 1A and 1B. FIGS. 2A2, 2B2, and 2C2 are plan views of the liquid crystal display device, and FIGS. 2A1, 2131, and 2C1 are cross-sectional views taken along line Y-Z in FIGS. 2A2, 2B2, and 2C2, respectively.

The first substrate 100 and the second substrate 101 are bonded to each other by the sealant 103 (103a and 103b). The liquid crystal layer 110 is provided between the first substrate 100 and the second substrate 101 (see FIGS. 2A1 and 2A2). The sealant 103 is provided so as to surround the liquid crystal layer 110. Before light irradiation treatment of the photocurable resin, the entire region of the liquid crystal layer 110 is a low polymerization region 102.

Polymer stabilization treatment is performed on the low polymerization region 102 of the liquid crystal layer 110, so that the photocurable resin is selectively polymerized. As the polymer stabilization treatment, light irradiation treatment in which an irradiation region is a linear shape is performed. The liquid crystal layer 110 is scanned and irradiated with tight 104 processed into a linear shape in the direction of an arrow 105. In the liquid crystal layer 110, the photocurable resin is polymerized in a region irradiated with the light 104; thus, a high polymerization region 106 in which the polymerization degree is high is formed. Since the light irradiation treatment is selectively performed on the liquid crystal layer 110, a region where the light irradiation treatment is not performed is still the low polymerization region, that is, a low polymerization region 107 (see FIGS. 2B1 and 2B2). Note that here, the liquid crystal layer 110 may be scanned relative to the light 104; therefore, the irradiation means of the light 104 may be moved, or the first substrate 100 over which the liquid crystal layer 110 is formed may be moved.

A region including a display region is irradiated up to shortly before the sealant 103b while being scanned with the light 104 processed into a linear shape, so that the high polymerization region 108 and the low polymerization region 109 which is in contact with the sealant 103b are formed. Through the above-described steps, the liquid crystal layer 110 including the high polymerization region 108 and the low polymerization region 109 is formed (see FIGS. 2C1 and 2C2).

Since the irradiation is performed by moving the light 104, the irradiation region can be easily controlled. A region which is in contact with the sealant 103b serves as the low polymerization region 109, whereby extreme change in viscosity of the liquid crystal mixture at the boundaries can be reduced when the photocurable resin is polymerized. Accordingly, a stable blue phase can be obtained in the high polymerization region 108.

In the liquid crystal layer 110, the high polymerization region 108 may be used for a display region (a pixel region), and the low polymerization region 109 may be used for a driver circuit region or a region covered by a housing, which does not contribute to display.

Further, strength in the high polymerization region 108 of the liquid crystal layer 110 is increased by the polymerization reaction; therefore, the high polymerization region 108 has higher strength than the low polymerization region 109. Therefore, it is effective to use the high polymerization region 108 for a display portion, which is an exposed portion in the liquid crystal display device, in terms of reliability. In addition, since the strength is increased by the polymerization reaction, flexible substrates can be used as the first substrate 100 and the second substrate 101; thus, a flexible liquid crystal display device can be formed.

The above linear light irradiation region may be formed by linearly arranging a plurality of light sources or by processing irradiation light from a light source with an optical system.

Further, the shape of the light irradiation region in the liquid crystal layer may be rectangular, circular, elliptical, or the like instead of linear. In addition, as the irradiation light, lamp light from a lamp light source, laser light from a laser light source, or the like can be used. Light having a wavelength and energy with which polymerization reaction of the photocurable resin occurs may be selected as appropriate. In the case where an ultraviolet curable resin (a UV curable resin) is used as the photocurable resin, for example, ultraviolet rays (light) may be used for the polymer stabilization treatment.

Since light irradiation treatment of regions of the liquid crystal layer 110 is performed at times different for each of the regions, so that polymerization of the photocurable resin proceeds in a certain direction, shape defects such as cracks due to rapid change in the condition of the liquid crystal layer 110 can be reduced.

Since the light irradiation treatment is performed while the liquid crystal layer is scanned relative to the light irradiation means, even a large-sized substrate can be treated. Thus, a uniform and stable blue phase can be obtained.

The liquid crystal layer 110 can be formed by a dispenser method (a dropping method), or an injecting method by which a liquid crystal is injected using a capillary phenomenon after the first substrate 100 is attached to the second substrate 101.

A liquid crystal material exhibiting a blue phase is used for the liquid crystal layer 110. The liquid crystal material exhibiting a blue phase has a short response time of 1 msec or less and enables high-speed response, whereby the liquid crystal display device can have higher performance.

The liquid crystal material exhibiting a blue phase includes a liquid crystal and a chiral agent. The chiral agent is employed to align the liquid crystal in a helical structure and to make the liquid crystal to exhibit a blue phase. For example, a liquid crystal material into which a chiral agent is mixed at 5 wt % or more may be used for the liquid crystal layer.

As the liquid crystal, a thermotropic liquid crystal, a low-molecular liquid crystal, a high-molecular liquid crystal, a ferroelectric liquid crystal, an anti-ferroelectric liquid crystal, or the like is used.

As the chiral agent, a material having a high compatibility with a liquid crystal and a strong twisting power is used. Either one of two enantiomers, R and S, is used, and a racemic mixture in which R and S are mixed at 50:50 is not used.

The above liquid crystal material exhibits a cholesteric phase, a cholesteric blue phase, a smectic phase, a smectic blue phase, a cubic phase, a chiral nematic phase, an isotropic phase, or the like depending on conditions.

A cholesteric blue phase and a smectic blue phase, which are blue phases, are seen in a liquid crystal material having a cholesteric phase or a smectic phase with a relatively short helical pitch of less than or equal to 500 nm. The alignment of the liquid crystal material has a double twist structure. Having the order of less than or equal to an optical wavelength, the liquid crystal material is transparent, and optical modulation action is generated through a change in alignment order by voltage application. A blue phase is optically isotropic and thus has no viewing angle dependence. Thus, an alignment film is not necessarily formed; therefore, display image quality can be improved and cost can be reduced.

Since the blue phase is exhibited only in a narrow temperature range, a photocurable resin and a photopolymerization initiator is added to a liquid crystal material and polymer stabilization treatment is performed in order to widen the temperature range. The polymer stabilization treatment is performed in such a manner that a liquid crystal material including a liquid crystal, a chiral agent, a photocurable resin, and a photopolymerization initiator is irradiated with light having a wavelength with which the photocurable resin and the photopolymerization initiator react. This polymer stabilization treatment may be performed by irradiating a liquid crystal material exhibiting an isotropic phase with light, or by irradiating a liquid crystal material exhibiting a blue phase under the control of the temperature, with light.

Therefore, the light irradiation treatment on the liquid crystal layer 110 may be performed while the liquid crystal layer 110 is heated by a heating means. A stage having a heat source such as a heater may be used as the heating means, and the substrate may be arranged thereover. The heat treatment may be selectively performed on only the high polymerization region 108 in a manner similar to that of the light irradiation treatment.

The photocurable resin may be a monofunctional monomer such as acrylate or methacrylate; a polyfunctional monomer such as diacrylate, triacrylate, dimethacrylate, or trimethacrylate; or a mixture thereof. Further, the photocurable resin may have liquid crystallinity, non-liquid crystallinity, or both of them. A resin that is polymerized with light having a wavelength with which the photopolymerization initiator to be used reacts may be selected as the photocurable resin, and an ultraviolet curable resin can be typically used.

As the photopolymerization initiator, a radical polymerization initiator which generates radicals by light irradiation, an acid generator which generates an acid by light irradiation, or a base generator which generates a base by light irradiation may be used.

Specifically, a mixture of JC-1041XX (produced by Chisso Corporation) and 4-cyano-4'-pentylbiphenyl can be used as the liquid crystal material. ZLI-4572 (produced by Merck Ltd., Japan) can be used as the chiral agent. As the photocurable resin, 2-ethylhexyl acrylate, RM257 (produced by Merck Ltd., Japan), or trimethylolpropane triacrylate can be used. As the photopolymerization initiator, 2,2-dimethoxy-2-phenylacetophenone can be used.

Although not illustrated in FIGS. 1A and 1B and FIGS. 2A1, 2A2, 2B1, 2B2, 2C1, and 2C2, an optical film or the like, such as a polarizing plate, a retardation plate, or an anti-reflection film may be provided as appropriate. For example, circular polarization may be employed using a polarizing plate or a retardation plate. Further, a backlight, a sidelight, or the like may be used as a light source.

In the case where, in this specification, the liquid crystal display device is a transmissive liquid crystal display device in which display is performed by transmission of light from a light source (or a semi-transmissive liquid crystal display device), it is necessary that light be transmitted at least in a pixel region. Therefore, the first substrate, the second substrate, and thin films such as an insulating film and a conductive film that exist in the pixel region through which the light passes all have a property of transmitting light in a visible wavelength range.

An electrode layer (referred to as a pixel electrode layer, a common electrode layer, a counter electrode layer, or the like) for applying voltage to the liquid crystal layer preferably has a light-transmitting property; however, a non-light-transmitting material such as a metal film may be used depending on a pattern of the electrode layer.

The electrode layer can be formed using one kind or plural kinds of the following: indium tin oxide (ITO), indium zinc oxide (IZO) in which zinc oxide (ZnO) is mixed into indium oxide, a conductive material in which silicon oxide ($SiO_2$) is mixed into indium oxide, organoindium, organotin, indium oxide containing tungsten oxide, indium zinc oxide containing tungsten oxide, indium oxide containing titanium oxide, or indium tin oxide containing titanium oxide; metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; or a nitride thereof.

Further, the electrode layer can be formed using a conductive composition including a conductive high molecule (also referred to as a conductive polymer). A pixel electrode formed using the conductive composition preferably has a sheet resistance of less than or equal to 10000 ohms per square and a transmittance of greater than or equal to 70% at a wavelength of 550 nm. Further, the resistivity of the conductive high molecule included in the conductive composition is preferably less than or equal to $0.1\Omega\cdot cm$.

As the conductive high molecule, a so-called π-electron conjugated conductive polymer can be used. For example, polyaniline or a derivative thereof, polypyrrole or a derivative thereof, polythiophene or a derivative thereof, a copolymer of two or more kinds of them, and the like can be given.

As the first substrate 100 and the second substrate 101, a glass substrate made of barium borosilicate glass, aluminoborosilicate glass, or the like, a quartz substrate, or a flexible substrate such as a plastic substrate can be used.

As the sealant 103, typically, a visible light curable resin, an ultraviolet curable resin, or a thermosetting resin is preferably used. Typically, an acrylic resin, an epoxy resin, an amine resin, or the like can be used. Further, a photopolymerization initiator (typically, an ultraviolet polymerization initiator), a thermosetting agent, a filler, or a coupling agent may be included in the sealant 103.

In the above-described manner, a highly reliable liquid crystal display device which includes a liquid crystal layer exhibiting a stable blue phase can be manufactured. In addition, yield in manufacture is increased.

Embodiment 2

In this embodiment, an example of a method for manufacturing a liquid crystal display device of Embodiment 1 in combination with a mask will be described with reference to FIGS. 3A and 3B and FIGS. 4A1, 4A2, 4B1, 4B2, 4C1, and 4C2. Therefore, part of this embodiment can be performed in a manner similar to that of Embodiment 1, and repetitive description of the same portions or portions having functions similar to those in Embodiment 1 and steps for manufacturing such portions will be omitted.

Figure 3A:
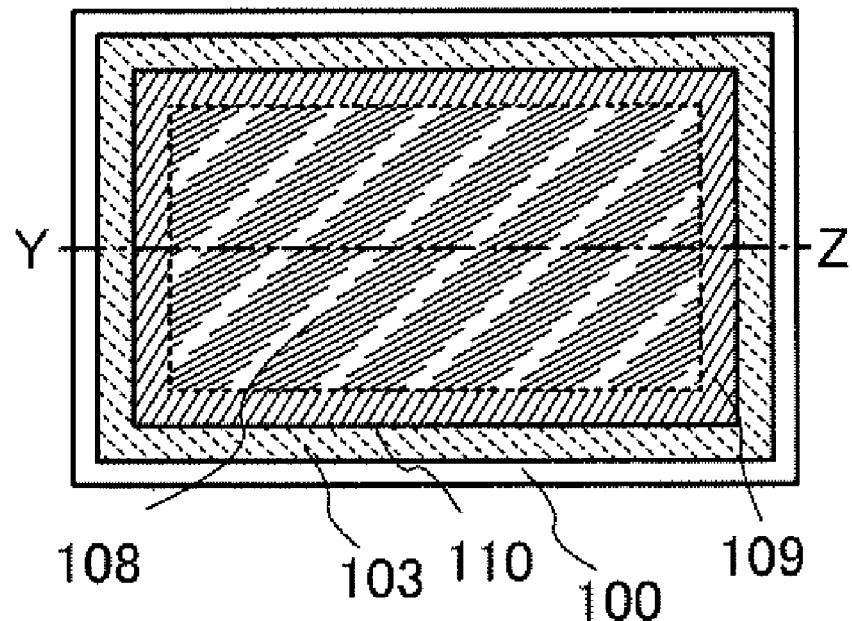
FIGS. 3A and 3B are views illustrating a liquid crystal display device.
Figure 3B:
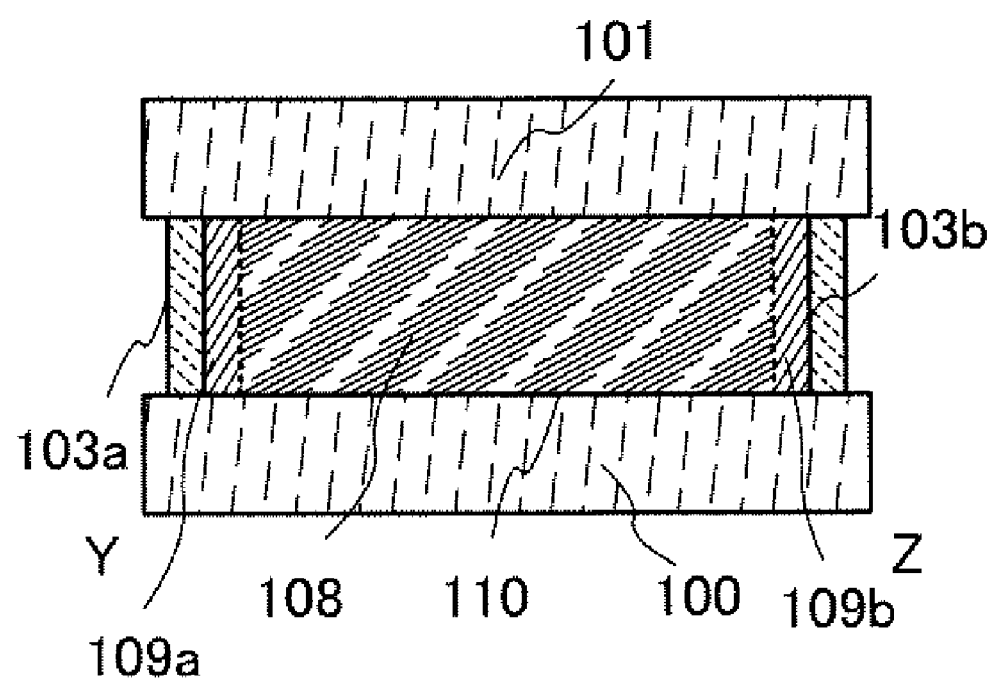

FIG. 3A is a plan view of a liquid crystal display device. FIG. 3B is a cross-sectional view taken along line Y-Z in FIG. 3A.

A first substrate 100 and a second substrate 101 are bonded (attached) to each other by a sealant 103 (103a and 103b). A liquid crystal layer 110 is provided between the first substrate 100 and the second substrate 101. The liquid crystal layer 110 includes a photocurable resin and a liquid crystal material exhibiting a blue phase. In the liquid crystal layer 110, a high polymerization region 108 refers to a region (a first region) where light irradiation treatment of the photocurable resin is performed as polymer stabilization treatment, and a low polymerization region 109 (109a and 109b) refers to a region (a second region) where the light irradiation treatment is not performed.

The liquid crystal layer 110 in this embodiment is an example in which the low polymerization region 109 is formed in a region that is in contact with the sealant 103 surrounding the liquid crystal layer 110, and the high polymerization region 108 is formed in a central portion of the liquid crystal layer 110.

FIGS. 4A1, 4A2, 4B1, 4B2, 4C1, and 4C2 illustrate a method for manufacturing the liquid crystal display device in FIGS. 3A and 3B. FIGS. 4A2, 4B2, and 4C2 are plan views of the liquid crystal display device, and FIGS. 4A1, 4B1, and 4C1 are cross-sectional views taken along line Y-Z in FIGS. 4A2, 4B2, and 4C2, respectively.

The first substrate 100 and the second substrate 101 are bonded to each other by the sealant 103 (103a and 103b), and the liquid crystal layer 110 is provided between the first substrate 100 and the second substrate 101 (see FIGS. 4A1 and 4A2). The sealant 103 is provided so as to surround the liquid crystal layer 110. Before the light irradiation treatment of the photocurable resin, the entire region of the liquid crystal layer 110 is a low polymerization region 102 in the entire region.

The polymer stabilization treatment is performed on the low polymerization region 102 of the liquid crystal layer 110, so that the photocurable resin is selectively polymerized. The light irradiation treatment in which an irradiation region is processed into a linear shape is performed as the polymer stabilization treatment. In this embodiment, a mask 111 is used in the light irradiation. Scan by light 104 is performed with the use of the mask 111, whereby the processed region can be controlled to have a more complicated shape.

The mask 111 is formed using a light-blocking material, and reflects or absorbs the light 104; thus, the irradiation with the light 104 on the liquid crystal layer is blocked. In this embodiment, the light-blocking mask 111 is used as an example; however, a light-blocking layer may be formed between the second substrate 101 and the liquid crystal layer 110. In the case where a thin film transistor is formed, this light-blocking layer also has a function of preventing characteristic variation due to light irradiation from being generated in the thin film transistor.

The liquid crystal layer 110 is scanned and irradiated with the light 104 processed into a linear shape in the direction of an arrow 105. In the liquid crystal layer 110, a region irradiated with the light 104 is a high polymerization region 106. Since the light irradiation treatment is selectively performed on the liquid crystal layer 110, a region where the light irradiation treatment is not performed is still a low polymerization region, that is, a low polymerization region 107.

The liquid crystal layer 110 is scanned and irradiated with the light 104 processed into a linear shape with the use of the mask 111, so that the high polymerization region 108 and the low polymerization region 109 which is in contact with the sealant 103 are formed. Through the above-described steps, the liquid crystal layer 110 including the high polymerization region 108 and the low polymerization region 109 which surrounds the high polymerization region 108 and is in contact with the sealant 103 is formed (see FIGS. 4C1 and 4C2).

Since the irradiation is performed using the mask 111 while the light 104 is moved, a complicated irradiation region can be easily controlled. The low polymerization region 109 exists in a region which is in contact with the sealant 103, whereby extreme change in viscosity of the liquid crystal mixture at the boundaries can be reduced when the photocurable resin is polymerized. Accordingly, a stable blue phase can be obtained in the high polymerization region 108.

Since light irradiation treatment of regions of the liquid crystal layer 110 is performed at times different for each of the regions, so that polymerization of the photocurable resin proceeds in a certain direction, shape defects such as cracks due to rapid change in the condition of the liquid crystal layer 110 can be reduced.

Since the light irradiation treatment is performed while the liquid crystal layer is scanned relative to the light irradiation means, even a large-sized substrate can be treated. Thus, a uniform and stable blue phase can be obtained.

In the above-described manner, a highly reliable liquid crystal display device which includes a liquid crystal layer exhibiting a stable blue phase can be manufactured. In addition, yield in manufacture can be increased.

Embodiment 3

In this embodiment, an example of manufacturing a plurality of liquid crystal display devices over a large-sized substrate (a so-called multiple panel method) in Embodiment 1 or Embodiment 2 will be described with reference to FIGS. 5A to 5C. Therefore, part of this embodiment can be performed in a manner similar to that of Embodiment 1 or Embodiment 2, and repetitive description of the same portions or portions having functions similar to those in Embodiment 1 or Embodiment 2 and steps for manufacturing such portions will be omitted.

In the case of manufacturing a plurality of liquid crystal display devices using a large-sized substrate, a division step can be performed before polymer stabilization treatment or before provision of polarizing plates. In consideration of the influence of the division step on a liquid crystal layer (such as alignment disorder due to force applied in the division step), it is preferable that the division step be performed after the attachment between a first substrate and a second substrate and before the polymer stabilization treatment.

Figure 5A:
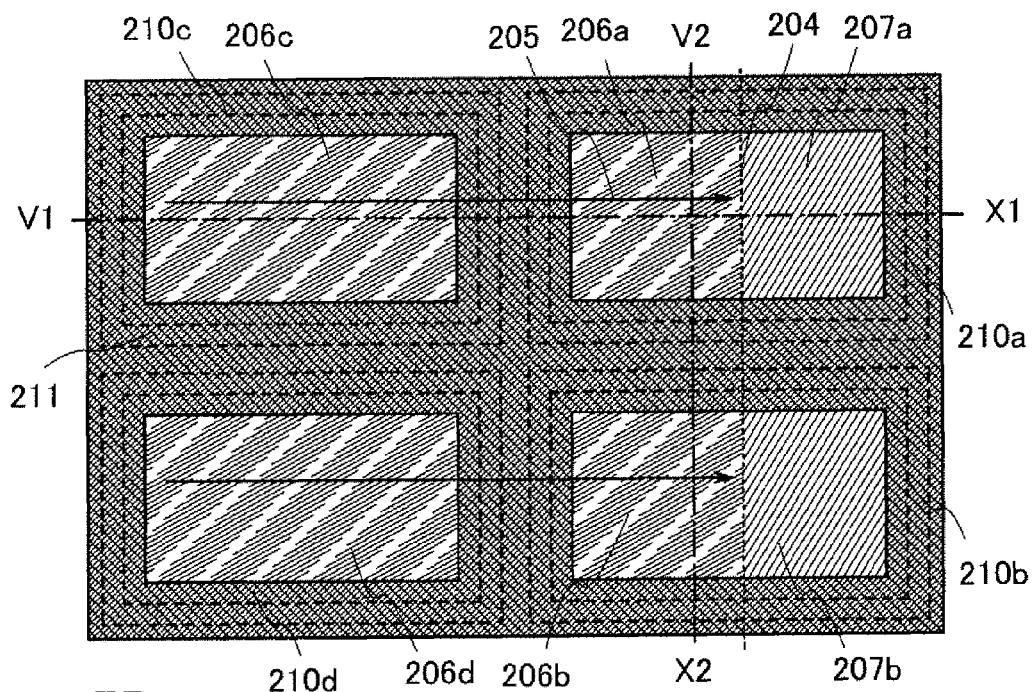
FIGS. 5A to 5C are views illustrating a method for manufacturing a liquid crystal display device.
Figure 5B:
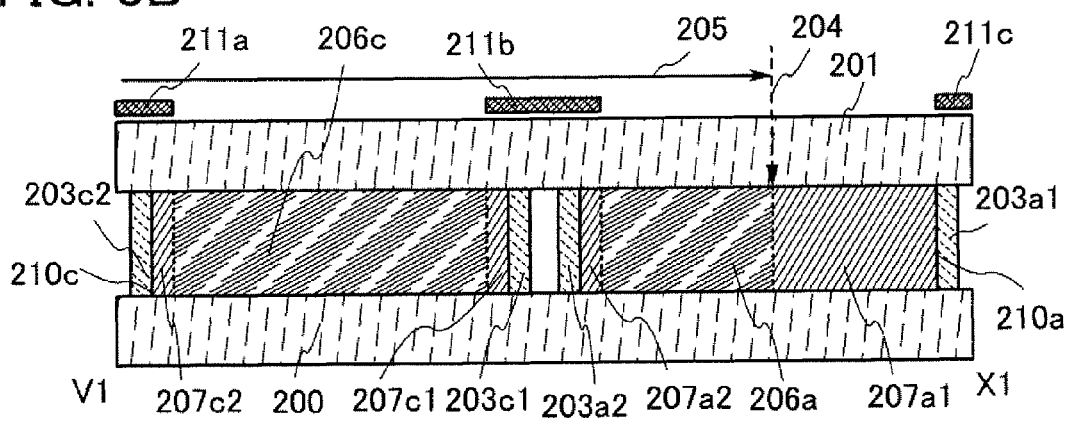
Figure 5C:
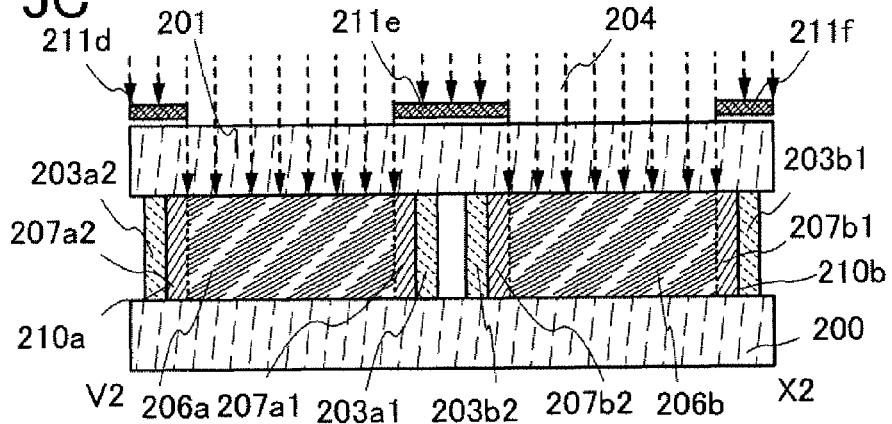

FIG. 5A is a plan view of a liquid crystal display device, FIG. 5B is a cross-sectional view taken along line V1-X1 in FIG. 5A, and FIG. 5C is a cross-sectional view taken along line V2-X2 in FIG. 5A.

In FIGS. 5A and 5B, four liquid crystal layers 210a, 210b, 210c and 210d are interposed between a first substrate 200 and a second substrate 201 which are bonded (attached) to each other, and arranged to be surrounded by sealants 203a, 203b, 203c, and 203d, respectively. Each of the liquid crystal layers 210a, 210b, 210c, and 210d includes a photocurable resin and a liquid crystal material exhibiting a blue phase.

FIGS. 5A to 5C illustrate steps in which the plurality of liquid crystal layers 210a, 210b, 210c, and 210d are scanned with light 204 with the use of a mask 211 so that polymer stabilization treatment is selectively performed; thus, high polymerization regions 206a, 206b, 206c, and 206d, and low polymerization regions 207a (207a1 and 207a2), 207b (207b1 and 207b2), 207c (207c1 and 207c2), and 207d (formed between the high polymerization region 206d and the sealant 203d in a manner similar to that of the liquid crystal layer 210c, though not illustrated) are formed.

FIG. 5B illustrates a cross section taken along a surface parallel to an arrow 205 which indicates a scanning direction of the light 204. In the liquid crystal layer 210a and 210c, polymerization reaction proceeds in a region which is irradiated with the light 204 without being shielded by the mask 211 (211a, 211b, and 211c), so that the high polymerization regions 206a and 206c are formed. On the contrary, a region which is covered with the mask 211 (211a, 211b, and 211c) to be shielded from the light 204 or a region which is not scanned with the light 204 is not subjected to the light irradiation treatment, so that the low polymerization regions 207c1, 207c2, 207a1, and 207a2 are formed. In the liquid crystal layer 210c, the low polymerization region 207c (207c1 and 207c2) is formed between the high polymerization region 206c and the sealant 203c (203c1 and 203c2). In the liquid crystal layer 210a, the low polymerization region 207a (207a1 and 207a2) is formed between the high polymerization region 206a and the sealant 203a (203a1 and 203a2) in a similar manner.

FIG. 5C is a cross-sectional view taken along a surface perpendicular to the arrow 205 which indicates the scanning direction of the light 204. In the liquid crystal layers 210a and 210b, polymerization reaction proceeds in a region which is irradiated with the light 204 without being shielded by the mask 211 (211d, 211e, and 211f), so that the high polymerization regions 206a and 206b are formed. On the contrary, a region which is covered with the mask 211 (211d, 211e, and 211f) to be shielded from the light 204 is not subjected to the light irradiation treatment, so that the low polymerization regions 207a1, 207a2, 207b1, and 207b2 are formed. In the liquid crystal layer 210a, the low polymerization region 207a (207a1 and 207a2) is formed between the high polymerization region 206a and the sealant 203a (203a1 and 203a2). In the liquid crystal layer 210b, the low polymerization region 207b (207b1 and 207b2) is formed between the high polymerization region 206b and the sealant 203b (203b1 and 203b2) in a similar manner.

In this manner, by combining the mask 211 with the linear light 204 which is formed long in the direction of a side of the substrate, polymer stabilization treatment can be performed on the plurality of liquid crystal layers at one time; therefore, productivity can be increased. In addition, since the light irradiation treatment is performed in such a manner that the substrate is scanned relative to the light irradiation means, a large-sized light exposure apparatus is not necessary even for a large-sized substrate.

In this embodiment, an example in which the low polymerization regions 207a2 and 207b1 are formed in the liquid crystal layers 210a and 210b with the use of the masks 211d and 211f as illustrated in FIG. 5C is described. However, the low polymerization regions 207a2 and 207b1 may be formed by controlling the shape of the light 204 so that the irradiation region does not reach the low polymerization regions 207a2 and 207b1.

A large-sized substrate is bent or warped in some cases. In this case, the substrate is placed vertically and subjected to scanning, whereby light irradiation treatment can be performed uniformly.

Since the irradiation is performed using the mask while the light is moved, a complicated irradiation region can be easily controlled. A region which is in contact with the sealant serves as the low polymerization region, whereby extreme change in viscosity of the liquid crystal mixture at the boundaries can be reduced when the photocurable resin is polymerized. Accordingly, a stable blue phase can be obtained in the high polymerization region.

Since light irradiation treatment of regions of the liquid crystal layer 110 is performed at times different for each of the regions, so that polymerization of the photocurable resin proceeds in a certain direction, shape defects such as cracks due to rapid change in the condition of the liquid crystal layer can be reduced.

Since the light irradiation treatment is performed while the liquid crystal layer is scanned relative to the light irradiation means, even a large-sized substrate can be treated. Thus, a uniform and stable blue phase can be obtained.

In the above-described manner, a highly reliable liquid crystal display device which includes a liquid crystal layer exhibiting a stable blue phase can be manufactured. In addition, yield in manufacture is increased.

Embodiment 4

In this embodiment, another example of a light irradiation method that can be applied to Embodiments 1 to 3 will be described with reference to FIGS. 6A to 6C. Therefore, part of this embodiment can be performed in a manner similar to that of Embodiments 1 to 3, and repetitive description of the same portions as or portions having functions similar to those in Embodiments 1 to 3 and steps for manufacturing such portions will be omitted.

Figure 6A:
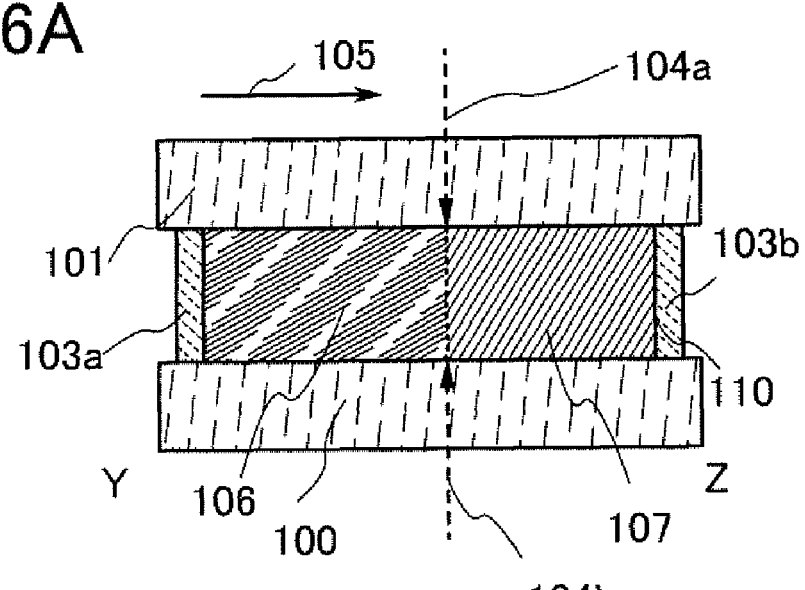
FIGS. 6A to 6C are views illustrating a method for manufacturing a liquid crystal display device.
Figure 6B:
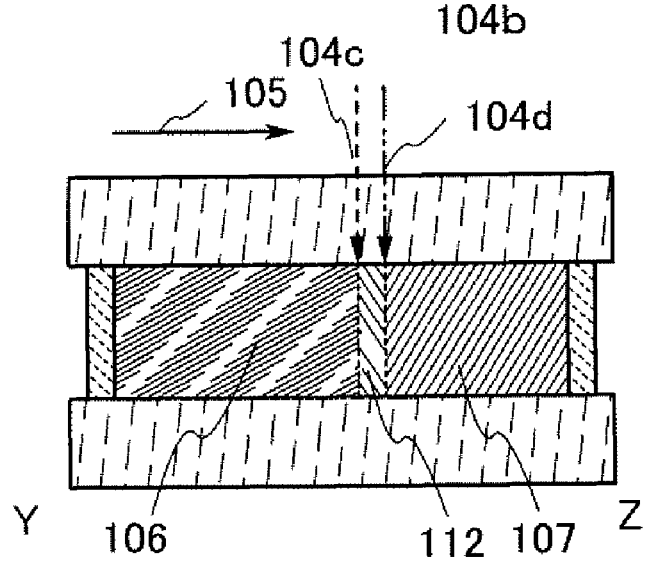
Figure 6C:
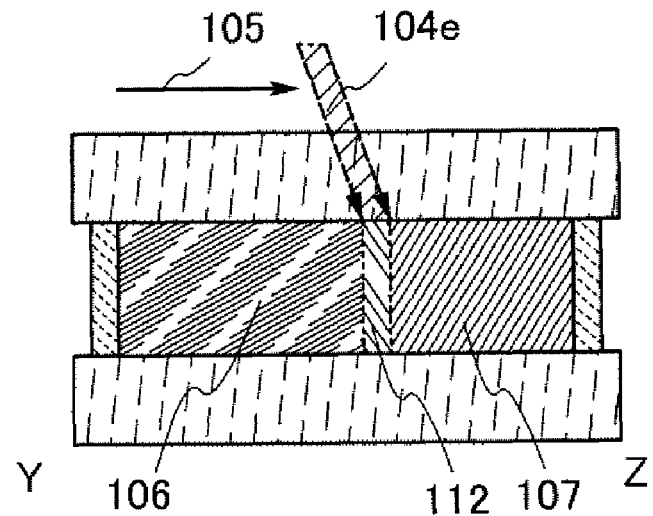

FIGS. 6A to 6C each illustrate an example in which light irradiation treatment is selectively performed on a liquid crystal layer.

As illustrated in FIG. 6A, in the light irradiation treatment, a plurality of irradiation means may be provided so that not one surface of the liquid crystal layer but both surfaces thereof are irradiated (both from the first substrate side and the second substrate side). A liquid crystal layer 110 is irradiated with light 104a which is delivered from the second substrate 101 side and with light 104b which is delivered from the first substrate 100 side. FIG. 6A illustrates an example in which the same region of the liquid crystal layer 110 is irradiated with the light 104a and the light 104b; however, different regions may be irradiated with the light 104a and the light 104b and a mask may be provided for each surface of the liquid crystal layer.

Alternatively, a plurality of lights supplying different energies may be used, and the liquid crystal layer may be irradiated with the plurality of lights in the order of increasing energy, starting from light which supplies the lowest energy to the liquid crystal layer. In FIG. 6B, light 104c and light 104d supply different energies, and the light 104d has lower energy than the light 104c. A region 112 which has been irradiated with the light 104d is irradiated with the light 104c; thus, a high polymerization region 106 is formed. In the case where plural kinds of photocurable resins to be polymerized are used, when the energy and the timing of the irradiation lights are thus controlled, polymerization speed can also be controlled. Accordingly, stabilization treatment can be performed more uniformly.

In the light irradiation treatment, a surface of the liquid crystal layer may be irradiated from an oblique direction. In FIG. 6C, light 104e delivered to the liquid crystal layer 110 is obliquely incident on a surface of the liquid crystal layer 110, which makes a difference in energy supplied to the irradiation region. Accordingly, polymerization speed of a photocurable resin can be controlled in a manner similar to that of FIG. 6B.

In the above-described manner, by control of light irradiation conditions (timing of irradiation, energy of light, and irradiation time) and the like, polymer stabilization can be performed on the liquid crystal layer more uniformly.

This embodiment can be implemented in combination with any of the structures described in the other embodiments as appropriate.

Thus, a highly reliable liquid crystal display device which includes a liquid crystal layer exhibiting a stable blue phase can be manufactured. In addition, yield in manufacture is increased.

Embodiment 5

The invention disclosed in this specification can be applied to both a passive matrix liquid crystal display device and an active matrix liquid crystal display device.

A thin film transistor is manufactured, and a liquid crystal display device having a display function can be manufactured using the thin film transistor in a pixel portion and further in a driver circuit. Further, part or whole of a driver circuit is formed over the same substrate as a pixel portion with the use of a thin film transistor, whereby a system-on-panel can be obtained.

The liquid crystal display device includes a liquid crystal element (also referred to as a liquid crystal display element) as a display element.

Further, a liquid crystal display device includes a panel in which a display element is sealed, and a module in which an IC or the like including a controller is mounted on the panel. The liquid crystal display device also includes one mode of an element substrate before the display element is completed in a manufacturing process of the liquid crystal display device, and the element substrate is provided with a means to supply a current to the display element in each of a plurality of pixels.

Specifically, the element substrate may be in a state after only a pixel electrode of the display element is formed, a state after a conductive film to be a pixel electrode is formed and before the conductive film is etched to form the pixel electrode, or any of other states.

Note that a liquid crystal display device in this specification means an image display device, a display device, or a light source (including a lighting device). Further, the liquid crystal display device includes any of the following modules in its category: a module to which a connector such as a flexible printed circuit (FPC), a tape automated bonding (TAB) tape, or a tape carrier package (TCP) is attached; a module having a TAB tape or a TCP at the tip of which a printed wiring board is provided; and a module in which an integrated circuit (IC) is directly mounted on a display element by chip on glass (COG) method.

The appearance and a cross section of a liquid crystal display panel, which is one embodiment of a liquid crystal display device, will be described with reference to FIGS. 7A1, 7A2, and 7B. FIGS. 7A1 and 7A2 are top views of panels in which thin film transistors 4010 and 4011 formed over a first substrate 4001 and a liquid crystal element 4013 are sealed between the first substrate 4001 and a second substrate 4006 with a sealant 4005. FIG. 7B is a cross-sectional view taken along line M-N of FIGS. 7A1 and 7A2.

The sealant 4005 is provided so as to surround a pixel portion 4002 and a scanning line driver circuit 4004 which are provided over the first substrate 4001. The second substrate 4006 is provided over the pixel portion 4002 and the scanning line driver circuit 4004. Therefore, the pixel portion 4002 and the scanning line driver circuit 4004 are sealed together with a liquid crystal layer 4007, by the first substrate 4001, the sealant 4005, and the second substrate 4006.

In FIG. 7A1, a signal line driver circuit 4003 that is formed using a single crystal semiconductor film or a polycrystalline semiconductor film over a substrate separately prepared is mounted in a region that is different from the region surrounded by the sealant 4005 over the first substrate 4001. On the contrary, FIG. 7A2 illustrates an example in which part of a signal line driver circuit is formed over the first substrate 4001 with the use of a thin film transistor provided thereover. A signal line driver circuit 4003b is formed over the first substrate 4001 and a signal line driver circuit 4003a that is formed using a single crystal semiconductor film or a polycrystalline semiconductor film is mounted on the substrate separately prepared.

The liquid crystal layer 4007 in the pixel portion 4002 is a photocurable-resin high polymerization region 4008 where light irradiation treatment is performed as polymer stabilization treatment, and the liquid crystal layer 4007 over the scanning line driver circuit 4004 and the signal line driver circuit 4003b is a low polymerization region 4009. Since the low polymerization region 4009 exists in a region which is in contact with the sealant 4005 and formed over the driver circuits that do not contribute to display, extreme differences in boundary conditions of viscosity of a liquid crystal mixture can be reduced when the photocurable resin is polymerized. Accordingly, a stable blue phase can be obtained in the high polymerization region 4008.

Note that there is no particular limitation on the connection method of the driver circuit which is separately formed, and a COG method, a wire bonding method, a TAB method, or the like can be used. FIG. 7A1 illustrates an example of mounting the signal line driver circuit 4003 by a COG method, and FIG. 7A2 illustrates an example of mounting the signal line driver circuit 4003a by a TAB method.

The pixel portion 4002 and the scanning line driver circuit 4004 provided over the first substrate 4001 include a plurality of thin film transistors. FIG. 7B illustrates the thin film transistor 4010 included in the pixel portion 4002 and the thin film transistor 4011 included in the scanning line driver circuit 4004. An insulating layer 4020 and an interlayer film 4021 are provided over the thin film transistors 4010 and 4011.

A variety of thin film transistors can be applied to the thin film transistors 4010 and 4011 without particular limitation. In this embodiment, the thin film transistors 4010 and 4011 are n-channel thin film transistors.

A pixel electrode layer 4030 is provided over the first substrate 4001, and the pixel electrode layer 4030 is electrically connected to the thin film transistor 4010. The liquid crystal element 4013 includes the pixel electrode layer 4030, a common electrode layer 4031, and the liquid crystal layer 4007. Note that a polarizing plate 4032 and a polarizing plate 4033 are provided on the outer sides of the first substrate 4001 and the second substrate 4006, respectively. The common electrode layer 4031 is provided on the second substrate 4006 side, and the pixel electrode layer 4030 and the common electrode layer 4031 are stacked with the liquid crystal layer 4007 interposed therebetween.

In a liquid crystal display device which includes a liquid crystal layer exhibiting a blue phase, method in which the gray scale is controlled by generating an electric field generally parallel (i.e., in a lateral direction) to a substrate to move liquid crystal molecules in a plane parallel to the substrate can be used. As such a method, an electrode structure used in an IPS mode illustrated in FIGS. 7A1, 7A2, and 7B is employed as an example in this embodiment.

For the first substrate 4001 and the second substrate 4006, glass, plastic, or the like having a light-transmitting property can be used. As plastic, a fiberglass-reinforced plastics (FRP) plate, a polyvinyl fluoride (PVF) film, a polyester film, or an acrylic resin film can be used. Further, a sheet in which aluminum foil is sandwiched by PVF films or polyester films can also be used.

A columnar spacer denoted by reference numeral 4035 is obtained by selective etching of an insulating film and is provided in order to control the thickness (a cell gap) of the liquid crystal layer 4007. Note that a spherical spacer may also be used. In the liquid crystal display device that uses the liquid crystal layer 4007, the thickness (the cell gap) of the liquid crystal layer 4007 is preferably about 4 μm to 20 μm.

Although FIGS. 7A1, 7A2, and 7B illustrate examples of transmissive liquid crystal display devices, this embodiment can also be applied to a semi-transmissive liquid crystal display device.

FIGS. 7A1, 7A2, and 7B illustrate examples of liquid crystal display devices in which a polarizing plate is provided on the outer side (the viewing side) of a substrate; however, the polarizing plate may be provided on the inner side of the substrate. The position of the polarizing plate may be determined as appropriate depending on the material of the polarizing plate and conditions of the manufacturing process. Furthermore, a light-blocking layer functioning as a black matrix may be provided.

The interlayer film 4021 is a light-transmitting chromatic color resin layer and functions as a color filter layer. A light-blocking layer may be included in part of the interlayer film 4021. In FIGS. 7A1, 7A2, and 7B, a light-blocking layer 4034 is provided on the second substrate 4006 side so as to cover the thin film transistors 4010 and 4011. The light-blocking layer 4034 functions as a mask for the low polymerization region 4009 in the light irradiation treatment which is polymer stabilization treatment. In addition, with the light-blocking layer 4034, contrast of the liquid crystal display device can be increased and the thin film transistors can be stabilized.

The thin film transistors may be, but not particularly limited to, covered with the insulating layer 4020 which functions as a protective film of the thin film transistors.

Note that the protective film is provided to prevent entry of an impurity floating in the air, such as an organic substance, a metal substance, or moisture, and is preferably a dense film. The protective film may be formed by a sputtering method to have a single-layer structure or a stacked structure including a silicon oxide film, a silicon nitride film, a silicon oxynitride film, a silicon nitride oxide film, an aluminum oxide film, an aluminum nitride film, an aluminum oxynitride film, or an aluminum nitride oxide film.

After the protective film is formed, a semiconductor layer may be annealed (at 300° C. to 400° C.).

Further, in the case of further forming a light-transmitting insulating layer as a planarizing insulating film, the light-transmitting insulating layer can be formed using an organic material having heat resistance, such as polyimide, acrylic, benzocyclobutene, polyamide, or epoxy. Other than such organic materials, it is also possible to use a low-dielectric constant material (a low-k material), a siloxane-based resin, phosphosilicate glass (PSG), borophosphosilicate glass (BPSG), or the like. The insulating layer may be formed by stacking a plurality of insulating films formed using these materials.

A method for forming the insulating layer is not particularly limited, and the following method can be employed depending on the material: a sputtering method, an SOG method, spin coating, dip coating, spray coating, a droplet discharging method (such as ink jetting, screen printing, or offset printing), doctor knife, roll coating, curtain coating, knife coating, or the like. In the case where the insulating layer is formed using a material solution, the semiconductor layer may be annealed (at 200° C. to 400° C.) at the same time of a baking step. The baking step of the insulating layer serves also as the annealing step of the semiconductor layer, and thereby a liquid crystal display device can be manufactured efficiently.

The pixel electrode layer 4030 and the common electrode layer 4031 can be formed using a light-transmitting conductive material such as indium oxide containing tungsten oxide, indium zinc oxide containing tungsten oxide, indium oxide containing titanium oxide, indium tin oxide containing titanium oxide, indium tin oxide (hereinafter referred to as ITO), indium zinc oxide, or indium tin oxide to which silicon oxide is added.

The pixel electrode layer 4030 and the common electrode layer 4031 can be formed using one kind or plural kinds selected from metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

A conductive composition including a conductive high molecule (also referred to as a conductive polymer) can be used for the pixel electrode layer 4030 and the common electrode layer 4031.

In addition, a variety of signals and potentials are supplied to the signal line driver circuit 4003 that is formed separately, and the scanning line driver circuit 4004 or the pixel portion 4002 from an FPC 4018.

Further, since the thin film transistor is easily broken by static electricity or the like, a protection circuit for protecting the driver circuit is preferably provided over the same substrate for a gate line or a source line. The protection circuit is preferably formed using a non-linear element.

In FIGS. 7A1, 7A2, and 7B, a connection terminal electrode 4015 is formed using the same conductive film as that of the pixel electrode layer 4030, and a terminal electrode 4016 is formed using the same conductive film as that of source and drain electrode layers of the thin film transistors 4010 and 4011.

The connection terminal electrode 4015 is electrically connected to a terminal included in the FPC 4018 through an anisotropic conductive film 4019.

Although FIGS. 7A1, 7A2, and 7B illustrate an example in which the signal line driver circuit 4003 is formed separately and mounted on the first substrate 4001, an embodiment of the present invention is not limited to this structure. The scanning line driver circuit may be formed separately and then mounted, or only part of the signal line driver circuit or part of the scanning line driver circuit may be formed separately and then mounted.

Figure 8:
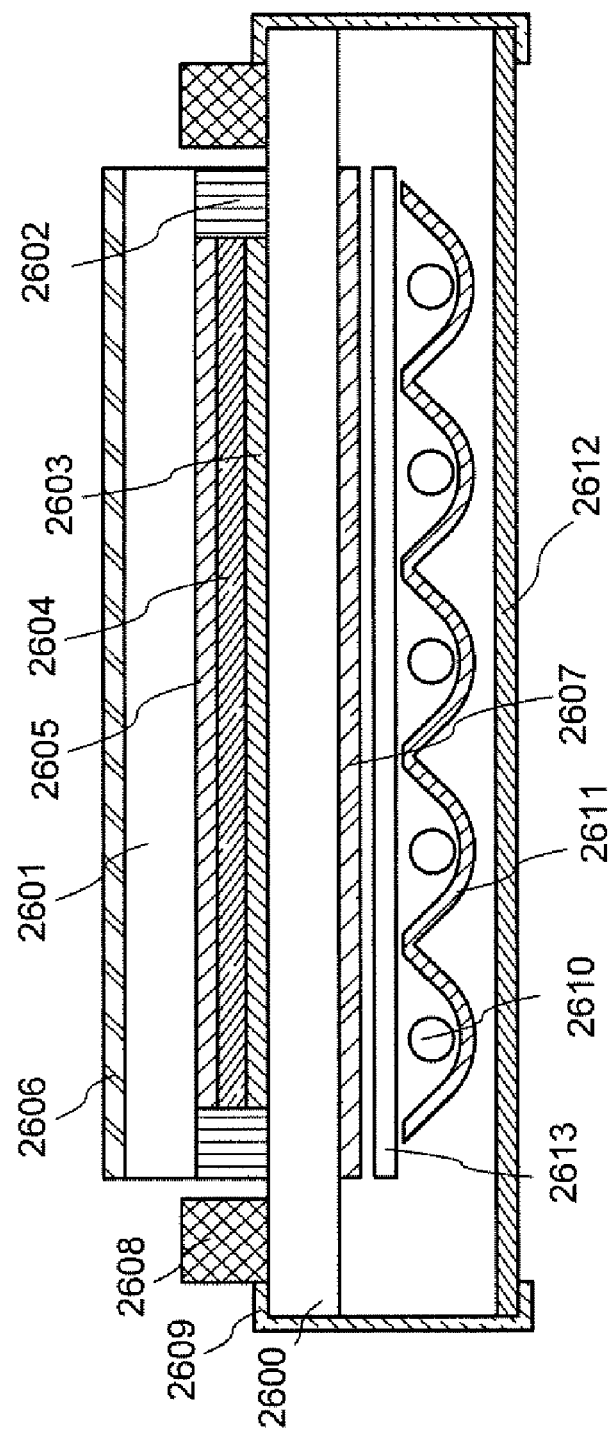
FIG. 8 is a view illustrating a liquid crystal display module.

FIG. 8 illustrates an example of a liquid crystal display module which is formed as a liquid crystal display device disclosed in this specification.

FIG. 8 illustrates an example of the liquid crystal display module, in which an element substrate 2600 and a counter substrate 2601 are bonded to each other by a sealant 2602, and an element layer 2603 including a TFT or the like, a display element 2604 including a liquid crystal layer, and a coloring layer 2605 that functions as a color filter are provided between the substrates to form a display region. The coloring layer 2605 which is a light-transmitting chromatic color resin layer is necessary to perform color display. In the case of the RGB system, coloring layers corresponding to respective colors of red, green, and blue are provided for respective pixels. A polarizing plate 2606 is provided on the outer side of the counter substrate 2601, and a polarizing plate 2607 and a diffuser plate 2613 are provided on the outer side of the element substrate 2600. A light source includes a cold cathode tube 2610 and a reflective plate 2611, and a circuit board 2612 is connected to a wiring circuit portion 2608 of the element substrate 2600 through a flexible wiring board 2609 and includes an external circuit such as a control circuit or a power source circuit. As the light source, a white diode may be used. The polarizing plate and the liquid crystal layer may be stacked with a retardation plate interposed therebetween.

Through the above-described steps, a highly reliable liquid crystal display panel as a liquid crystal display device can be manufactured.

This embodiment can be implemented in combination with any of the structures described in the other embodiments as appropriate.

Embodiment 6

There is no particular limitation on a semiconductor material used for a semiconductor layer of a thin film transistor included in the liquid crystal display device disclosed in this specification. An example of a material which can be used for the semiconductor layer of the thin film transistor will be described.

A semiconductor layer included in a semiconductor element can be formed using any of the following materials: an amorphous semiconductor (hereinafter also referred to as an "AS") formed by a vapor deposition method using a semiconductor material gas typified by silane or germane or by a sputtering method; a polycrystalline semiconductor fanned by crystallizing the amorphous semiconductor by utilizing light energy or thermal energy; a microcrystalline (also referred to as semiamorphous) semiconductor (hereinafter also referred to as a "SAS"); and the like. The semiconductor layer can be formed by a sputtering method, an LPCVD method, a plasma CVD method, or the like.

A microcrystalline semiconductor film belongs to a metastable state which is an intermediate state between amorphous and single crystal when Gibbs free energy is considered. In other words, the microcrystalline semiconductor film is a semiconductor having a third state which is stable in terms of free energy and has a short-range order and lattice distortion. Columnar-like or needle-like crystals grow in a normal direction with respect to a substrate surface. The Raman spectrum of microcrystalline silicon, which is a typical example of a microcrystalline semiconductor, shifts to the lower wavenumber side than 520 cm$^{-1}$ which represents single crystal silicon. That is, the peak of the Raman spectrum of the microcrystalline silicon exists between 520 cm$^{-1}$ which represents single crystal silicon and 480 cm$^{-1}$ which represents amorphous silicon. The semiconductor includes hydrogen or halogen of at least 1 at % or more to terminate a dangling bond. Moreover, a rare gas element such as helium, argon, krypton, or neon may be included to further promote lattice distortion, so that stability is enhanced and a favorable microcrystalline semiconductor film can be obtained.

This microcrystalline semiconductor film can be formed by a high-frequency plasma CVD method with a frequency of several tens of MHz to several hundreds of MHz or a microwave plasma CVD apparatus with a frequency of 1 GHz or more. The microcrystalline semiconductor film can be typically formed using a dilution of silicon hydride such as $SiH_4$, $Si_2H_6$, $SiH_2Cl_2$, $SiHCl_3$, $SiCl_4$, or $SiF_4$ with hydrogen. With a dilution with one kind or plural kinds of rare gas elements selected from helium, argon, krypton, and neon in addition to silicon hydride and hydrogen, the microcrystalline semiconductor film can be formed. In that case, the flow rate ratio of hydrogen to silicon hydride is set to be 5:1 to 200:1, preferably, 50:1 to 150:1, more preferably, 100:1.

As a typical amorphous semiconductor, hydrogenated amorphous silicon can be given. As a typical crystalline semiconductor, polysilicon and the like can be given. Polysilicon (polycrystalline silicon) includes so-called high-temperature polysilicon that uses polysilicon as a main material and is formed at a process temperature higher than or equal to 800° C., so-called low-temperature polysilicon that uses polysilicon as a main material and is formed at a process temperature lower than or equal to 600° C., polysilicon obtained by crystallizing amorphous silicon with the use of an element or the like that promotes crystallization, and the like. Needless to say, as described above, a microcrystalline semiconductor or a semiconductor which includes a crystal phase in part of the semiconductor layer can also be used.

As a material of the semiconductor, as well as an element such as silicon (Si) or germanium (Ge), a compound semiconductor such as GaAs, InP, SiC, ZnSe, GaN, or SiGe can be used.

In the case of using a crystalline semiconductor film for the semiconductor layer, the crystalline semiconductor film may be formed by various methods (such as a laser crystallization method, a thermal crystallization method, or a thermal crystallization method using an element such as nickel which promotes crystallization). Alternatively, a microcrystalline semiconductor which is a SAS can be crystallized by laser irradiation to improve the crystallinity. When the element that promotes crystallization is not introduced, before laser light irradiation on an amorphous silicon film, the amorphous silicon film is heated at 500° C. for one hour under a nitrogen atmosphere to release hydrogen contained therein so that the concentration of hydrogen is $1\times10^{20}$ atoms/cm$^3$ or less. This is because the amorphous silicon film containing a large amount of hydrogen is destroyed when being irradiated with laser light.

There is no particular limitation on a method for introducing a metal element into the amorphous semiconductor layer as long as the method is capable of making the metal element exist on the surface of or inside the amorphous semiconductor film. For example, a sputtering method, a CVD method, a plasma treatment method (including a plasma CVD method), an adsorption method, or a method of applying a solution of metal salt can be employed. Among these methods, the method using a solution is convenient and has an advantage in that the concentration of the metal element can be easily controlled. At this time, it is desirable to form an oxide film by UV light irradiation in an oxygen atmosphere, a thermal oxidation method, treatment with ozone water containing hydroxyl radical or hydrogen peroxide, or the like in order to improve wettability of the surface of the amorphous semiconductor film so that an aqueous solution is spread over the entire surface of the amorphous semiconductor film.

In a crystallization step in which an amorphous semiconductor film is crystallized to form a crystalline semiconductor film, an element which promotes crystallization (also referred to as a catalytic element or a metal element) may be added to the amorphous semiconductor film, and crystallization may be performed by heat treatment (at 550° C. to 750° C. for 3 minutes to 24 hours). As the element which promotes (accelerates) crystallization, one kind or plural kinds selected from iron (Fe), nickel (Ni), cobalt (Co), ruthenium (Ru), rhodium (Rh), palladium (Pd), osmium (Os), iridium (Ir), platinum (Pt), copper (Cu), and gold (Au) can be used.

In order to remove or reduce the element which promotes crystallization from the crystalline semiconductor film, a semiconductor film containing an impurity element is formed in contact with the crystalline semiconductor film so as to function as a gettering sink. The impurity element may be an impurity element imparting n-type conductivity, an impurity element imparting p-type conductivity, a rare gas element, or the like. For example, one kind or plural kinds selected from phosphorus (P), nitrogen (N), arsenic (As), antimony (Sb), bismuth (Bi), boron (B), helium (He), neon (Ne), argon (Ar), krypton (Kr), and xenon (Xe) can be used. A semiconductor film containing a rare gas element is formed over the crystalline semiconductor film containing the element which promotes crystallization, and heat treatment (at 550° C. to 750° C. for 3 minutes to 24 hours) is performed. The element which promotes crystallization contained in the crystalline semiconductor film moves into the semiconductor film containing a rare gas element, and thus the element which promotes crystallization contained in the crystalline semiconductor film is removed or reduced. After that, the semiconductor film containing a rare gas element that has served as a gettering sink is removed.

An amorphous semiconductor film may be crystallized by a combination of heat treatment and laser light irradiation, or one of heat treatment and laser light irradiation may be performed a plurality of times.

Further, the crystalline semiconductor film may be directly formed over a substrate by a plasma method. Alternatively, the crystalline semiconductor film may be selectively formed over the substrate by a plasma method.

An oxide semiconductor may be used for the semiconductor layer. For example, zinc oxide (ZnO), tin oxide (SnO$_2$), or the like can be used. In the case of using ZnO for the semiconductor layer, $Y_2O_3$, $Al_2O_3$, $TiO_2$, a stacked layer thereof, or the like can be used for a gate insulating layer, and ITO, Au, Ti, or the like can be used for a gate electrode layer, a source electrode layer, and a drain electrode layer. In addition, In, Ga, or the like can be added to ZnO.

As the oxide semiconductor, a thin film expressed by $InMO_3(ZnO)_m$ (m>0) can be used. Note that M denotes one or more of metal elements selected from gallium (Ga), iron (Fe), nickel (Ni), manganese (Mn), and cobalt (Co). In addition to a case where only Ga is contained as M, there is a case where Ga and the above metal elements other than Ga, for example, Ga and Ni or Ga and Fe are contained as M. Moreover, in the above oxide semiconductor, a transition metal element such as Fe or Ni or an oxide of the transition metal is contained as an impurity element in addition to a metal element contained as M in some cases. As the oxide semiconductor layer, for example, an In—Ga—Zn—O-based non-single-crystal film can be used.

As the oxide semiconductor layer (the $InMO_3(ZnO)_m$ (m>0) film), an $InMO_3(ZnO)_m$ (m>0) film in which M is another metal element may be used instead of the In—Ga—Zn—O-based non-single-crystal film.

This embodiment can be implemented in combination with any of the structures described in the other embodiments as appropriate.

Embodiment 7

A liquid crystal display device disclosed in this specification can be applied to a variety of electronic devices (including a game machine). Examples of electronic devices include television sets (also referred to as televisions or television receivers), monitors of computers or the like, cameras such as digital cameras or digital video cameras, digital photo frames, mobile phones (also referred to as cellular phones or mobile phone sets), portable game consoles, portable information terminals, audio reproducing devices, large-sized game machines such as pachinko machines, and the like.

Figure 9A:
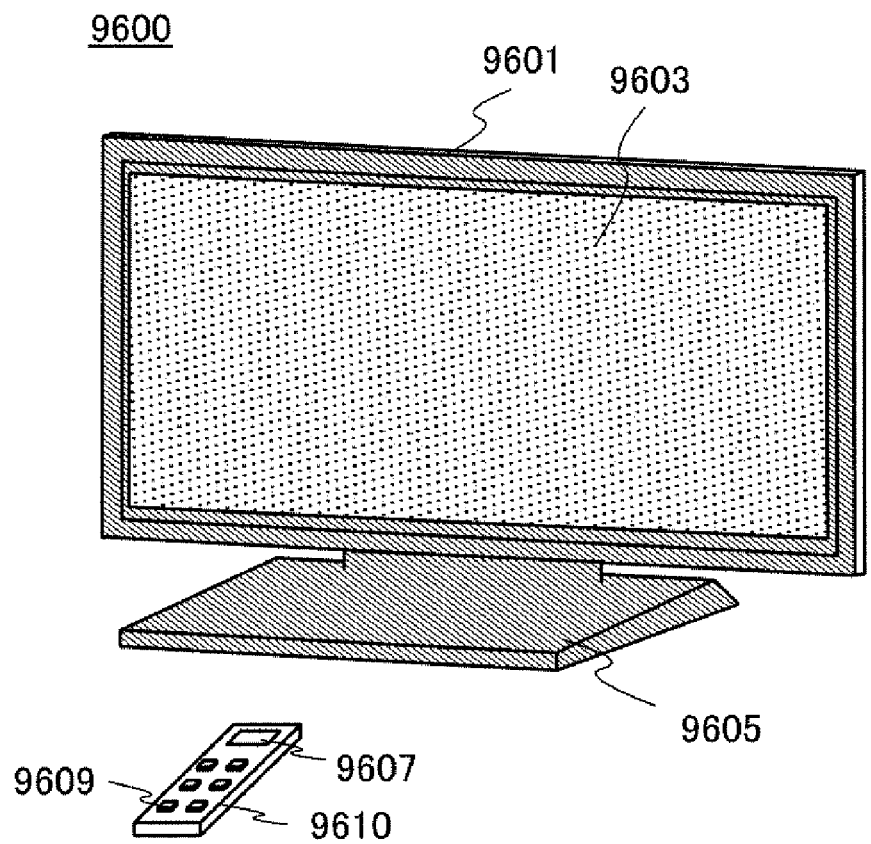
FIGS. 9A and 9B are external views respectively illustrating an example of a television set and an example of a digital photo frame.

FIG. 9A illustrates an example of a television set 9600. In the television set 9600, a display portion 9603 is incorporated in a housing 9601. Images can be displayed on the display portion 9603. Here, the housing 9601 is supported by a stand 9605.

The television set 9600 can be operated with an operation switch of the housing 9601 or a separate remote controller 9610. Channels and volume can be controlled with an operation key 9609 of the remote controller 9610 so that an image displayed on the display portion 9603 can be controlled. Furthermore, the remote controller 9610 may be provided with a display portion 9607 for displaying data output from the remote controller 9610.

Note that the television set 9600 is provided with a receiver, a modem, and the like. With the receiver, a general television broadcast can be received. Furthermore, when the television set 9600 is connected to a communication network by wired or wireless connection via the modem, one-way (from a transmitter to a receiver) or two-way (between a transmitter and a receiver, between receivers, or the like) data communication can be performed.

Figure 9B:
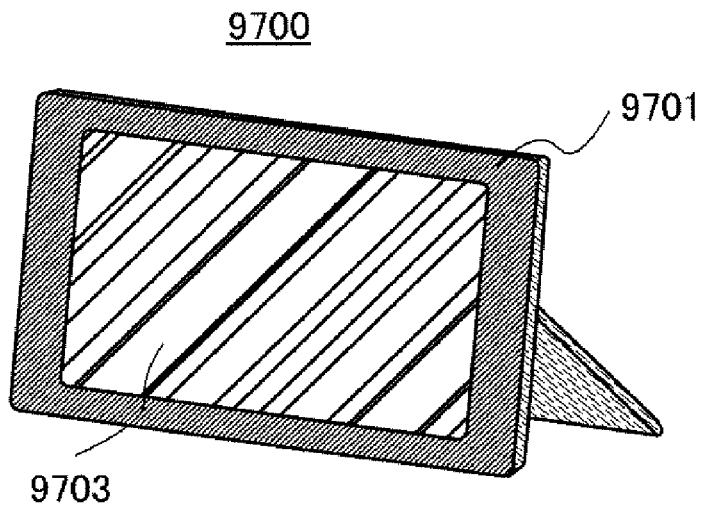

FIG. 9B illustrates an example of a digital photo frame 9700. For example, in the digital photo frame 9700, a display portion 9703 is incorporated in a housing 9701. Various images can be displayed on the display portion 9703. For example, the display portion 9703 can display data of an image shot by a digital camera or the like to function as a normal photo frame.

Note that the digital photo frame 9700 is provided with an operation portion, an external connection terminal (a USB terminal, a terminal that can be connected to various cables such as a USB cable, or the like), a storage medium insertion portion, and the like. Although they may be provided on the same surface as the display portion, it is preferable to provide them on the side surface or the back surface for the design of the digital photo frame 9700. For example, a memory storing data of an image shot by a digital camera is inserted in the storage medium insertion portion of the digital photo frame, whereby the image data can be downloaded and displayed on the display portion 9703.

The digital photo frame 9700 may have a structure capable of wirelessly transmitting and receiving data. Through wireless communication, desired image data can be downloaded to be displayed.

Figure 10A:
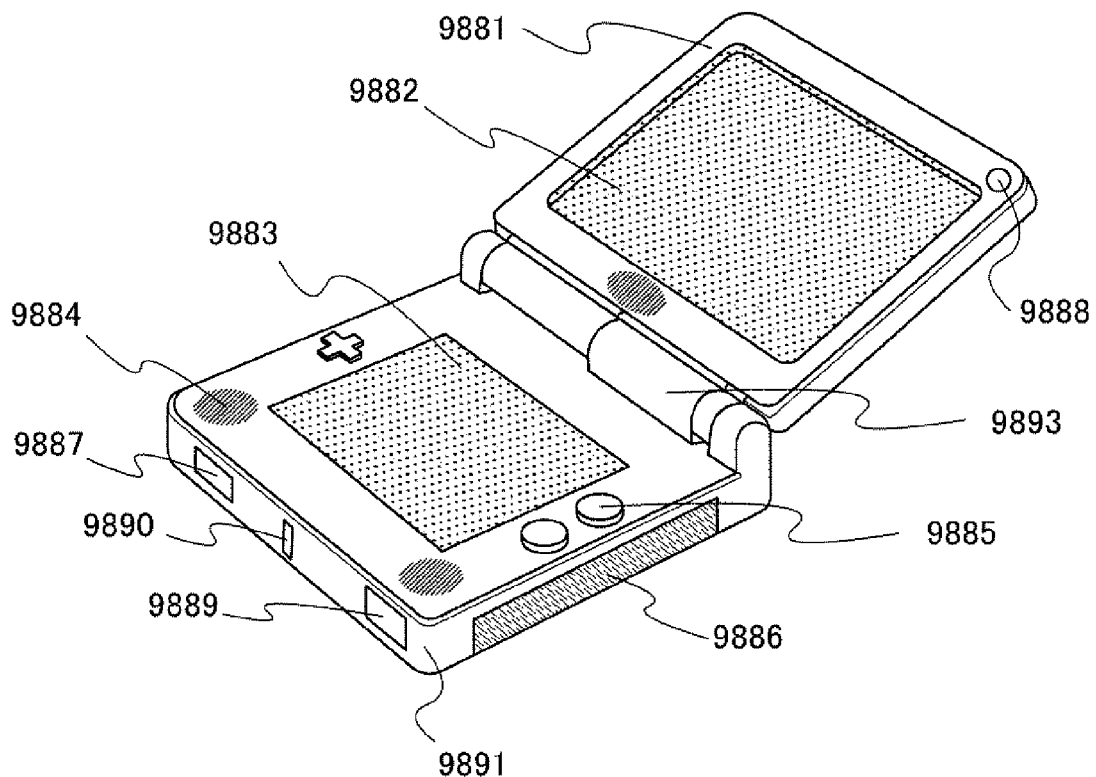
FIGS. 10A and 10B are external views each illustrating an example of a game machine.

FIG. 10A illustrates a portable game machine including a housing 9881 and a housing 9891 which are jointed with a connector 9893 so as to be able to be opened and closed. A display portion 9882 and a display portion 9883 are incorporated in the housing 9881 and the housing 9891, respectively. The portable game machine illustrated in FIG. 10A additionally includes a speaker portion 9884, a storage medium insertion portion 9886, an LED lamp 9890, an input means (operation keys 9885, a connection terminal 9887, a sensor 9888 (a sensor having a function of measuring force, displacement, position, speed, acceleration, angular speed, the number of rotations, distance, light, liquid, magnetism, temperature, chemical substance, sound, time, hardness, electric field, current, voltage, electric power, radiation, flow rate, humidity, tilt angle, vibration, smell, or infrared ray), and a microphone 9889), and the like. It is needless to say that the structure of the portable game machine is not limited to the above and other structures provided with at least a liquid crystal display device disclosed in this specification may be employed. The portable game machine may include an additional accessory as appropriate. The portable game machine illustrated in FIG. 10A has a function of reading out a program or data stored in a storage medium to display it on the display portion, and a function of sharing information with another portable game machine by wireless communication. The portable game machine in FIG. 10A can have various functions without limitation to the above.

Figure 10B:
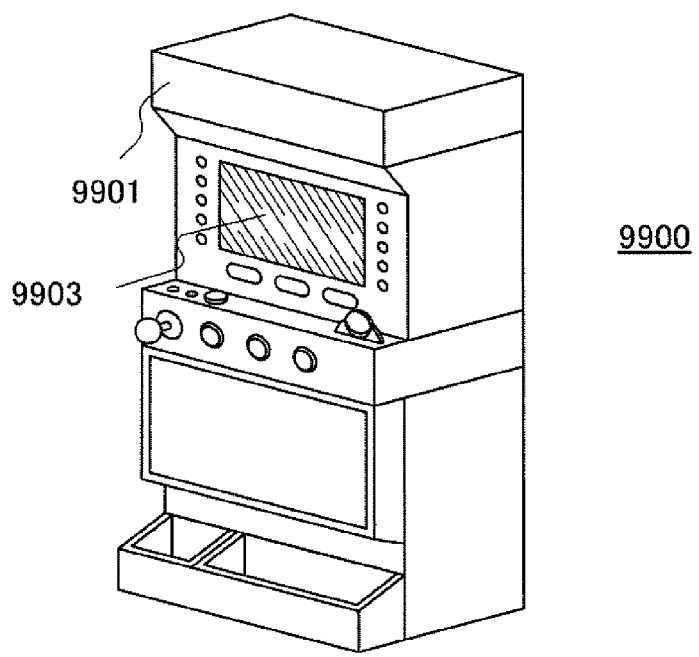

FIG. 10B illustrates an example of a slot machine 9900 which is a large-sized game machine. In the slot machine 9900, a display portion 9903 is incorporated in a housing 9901. In addition, the slot machine 9900 includes an operation means such as a start lever or a stop switch, a coin slot, a speaker, and the like. It is needless to say that the structure of the slot machine 9900 is not limited to the above and other structures provided with at least a liquid crystal display device disclosed in this specification may be employed. The slot machine may include an additional accessory as appropriate.

Figure 11A:
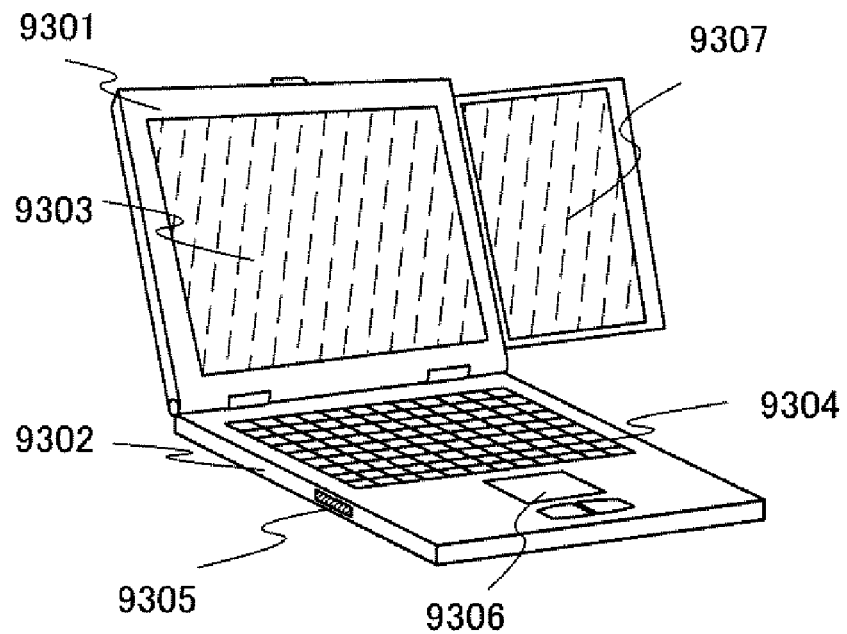
FIGS. 11A and 11B are external views respectively illustrating an example of a portable computer and an example of a mobile phone.

FIG. 11A is a perspective view illustrating an example of a portable computer.

In the portable computer of FIG. 11A, a top housing 9301 having a display portion 9303 and a bottom housing 9302 having a keyboard 9304 can overlap with each other by closing a hinge unit which connects the top housing 9301 and the bottom housing 9302. The portable computer in FIG. 11A is convenient for carrying around. Moreover, in the case of using the keyboard for input, the hinge unit is opened so that a user can input looking at the display portion 9303.

The bottom housing 9302 includes a pointing device 9306 with which input is performed, in addition to the keyboard 9304. Further, when the display portion 9303 is a touch input panel, input can be performed by touching part of the display portion. The bottom housing 9302 includes an arithmetic function portion such as a CPU or hard disk. In addition, the bottom housing 9302 includes another device, for example, an external connection port 9305 into which a communication cable conformable to communication standards of a USB is inserted.

The top housing 9301 further includes a display portion 9307 which can be stored in the top housing 9301 by being slid therein. Thus, a large display screen can be realized. In addition, the user can adjust the orientation of a screen of the storable display portion 9307. When the storable display portion 9307 is a touch input panel, input can be performed by touching part of the storable display portion.

The display portion 9303 or the storable display portion 9307 is formed using an image display device such as a liquid crystal display panel.

In addition, the portable computer in FIG. 11A can be provided with a receiver and the like and can receive a television broadcast to display an image on the display portion. While the hinge unit which connects the top housing 9301 and the bottom housing 9302 is kept closed, the whole screen of the display portion 9307 is exposed by sliding the display portion 9307 out and the angle of the screen is adjusted; thus, the user can watch a television broadcast. In this case, the hinge unit is not opened and display is not performed on the display portion 9303. In addition, start up of only a circuit for displaying the television broadcast is performed. Therefore, power consumption can be minimized, which is advantageous for the portable computer whose battery capacity is limited.

Figure 11B:
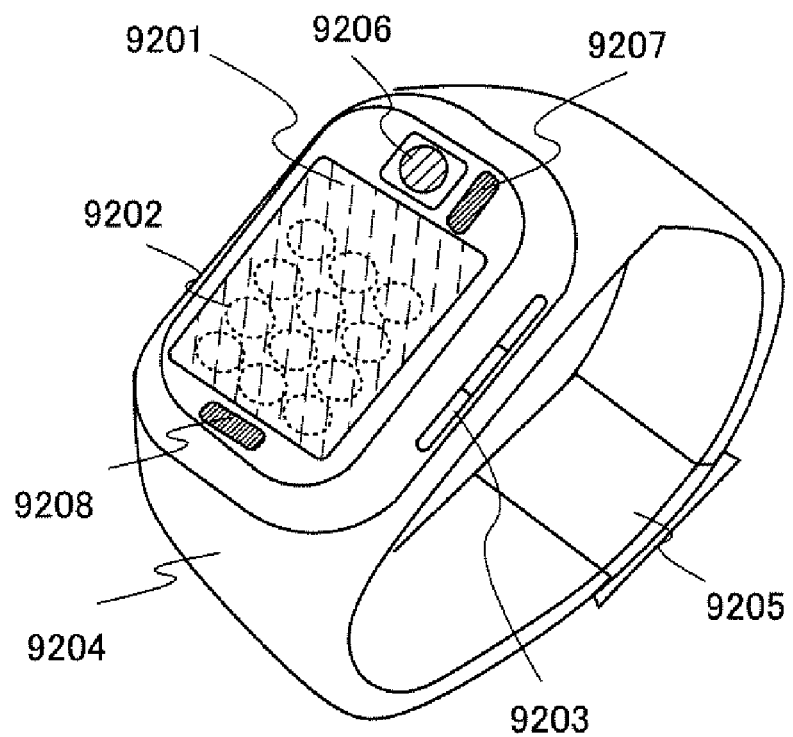

FIG. 11B is a perspective view illustrating an example of a mobile phone that a user can wear on the wrist like a wristwatch.

This mobile phone is formed including a main body which includes a communication device having at least a telephone function, and a battery; a band portion which enables the main body to be wore on the wrist; an adjusting portion 9205 for adjusting the band portion to fit the wrist; a display portion 9201; a speaker 9207; and a microphone 9208.

In addition, the main body includes operation switches 9203. The operation switches 9203 can serve, for example, as a switch for starting a program for the Internet when the switch is pushed, in addition to serving as a switch for turning on a power source, a switch for shifting the display, a switch for instruction to start taking images, or the like, and can be configured to have respective functions.

Input to this mobile phone is operated by touching the display portion 9201 with a finger, an input pen, or the like, by operating the operation switches 9203, or by inputting voice into the microphone 9208. Note that display buttons 9202 which are displayed on the display portion 9201 are illustrated in FIG. 11B. Input can be performed by touching the display buttons 9202 with a finger or the like.

Further, the main body includes a camera portion 9206 including an image pick-up means having a function of converting an image of an object, which is formed through a camera lens, to an electronic image signal. Note that the camera portion is not necessarily provided.

The mobile phone illustrated in FIG. 11B may be provided with a receiver of a television broadcast and the like, and thus can display an image on the display portion 9201 by receiving a television broadcast. In addition, the mobile phone illustrated in FIG. 11B may be provided with a storage device and the like such as a memory, and thus can record a television broadcast in the memory. The mobile phone illustrated in FIG. 11B may have a function of collecting location information, such as the GPS.

An image display device such as a liquid crystal display panel is used as the display portion 9201. The mobile phone illustrated in FIG. 11B is compact and lightweight and thus has limited battery capacity. Therefore, a panel which can be driven with low power consumption is preferably used as a display device for the display portion 9201.

Note that FIG. 11B illustrates the electronic device which is worn on the wrist; however, this embodiment is not limited thereto as long as a portable shape is employed.

This application is based on Japanese Patent Application serial no. 2009-076090 filed with Japan Patent Office on Mar. 26, 2009, the entire contents of which are hereby incorporated by reference.

What is claimed is:

1. A liquid crystal display device comprising:
   a first substrate;
   a liquid crystal layer provided over the first substrate, and comprising a photocurable resin and a liquid crystal material exhibiting a blue phase;
   a second substrate over the liquid crystal layer; and
   a sealant bonding the first substrate and the second substrate to each other,
   wherein a polymerization degree of the photocurable resin in a first region of the liquid crystal layer is higher than that in a second region of the liquid crystal layer,
   wherein the first region is a pixel region, and
   wherein the second region is a driver circuit region.

2. A liquid crystal display device comprising:
   a liquid crystal layer provided over the first substrate, and comprising a photocurable resin and a liquid crystal material exhibiting a blue phase;
   a second substrate over the liquid crystal layer; and
   a sealant bonding the first substrate and the second substrate to each other,
   wherein a polymerization degree of the photocurable resin in a first region of the liquid crystal layer is higher than that in a second region of the liquid crystal layer,
   wherein the second region is in contact with the sealant,
   wherein the first region is a pixel region, and
   wherein the second region is a driver circuit region.

3. The liquid crystal display device according to claim 1, wherein the liquid crystal layer includes a chiral agent.

4. The liquid crystal display device according to claim 2, wherein the liquid crystal layer includes a chiral agent.

5. The liquid crystal display device according to claim 1, wherein the liquid crystal layer includes a photo polymerization initiator.

6. The liquid crystal display device according to claim 2, wherein the liquid crystal layer includes a photo polymerization initiator.

7. A method for manufacturing a liquid crystal display device, comprising the steps of:
   bonding a first substrate and a second substrate to each other by a sealant with a liquid crystal layer that includes a photocurable resin and a liquid crystal material exhibiting a blue phase interposed therebetween; and
   selectively performing light irradiation treatment on the liquid crystal layer to form a pixel region and a driver circuit region in the liquid crystal layer, wherein a polymerization degree of the photocurable resin in the pixel region is higher than that in the driver circuit region, and
   wherein the light irradiation treatment is performed by scanning the liquid crystal layer with light in a certain direction.

8. A method for manufacturing a liquid crystal display device, comprising the steps of:
   bonding a first substrate and a second substrate to each other by a sealant with a liquid crystal layer that includes a photocurable resin and a liquid crystal material exhibiting a blue phase interposed therebetween; and selectively performing light irradiation treatment on the liquid crystal layer while the liquid crystal layer is heated to form a pixel region and a driver circuit region in the liquid crystal layer, wherein a polymerization degree of the photocurable resin in the pixel region is higher than that in the driver circuit region, and wherein the light irradiation treatment is performed by scanning the liquid crystal layer with light in a certain direction.

9. The method for manufacturing a liquid crystal display device, according to claim 7, wherein the driver circuit region is partly covered with a mask during the light irradiation treatment.

10. The method for manufacturing a liquid crystal display device, according to claim 8, wherein the driver circuit region is partly covered with a mask during the light irradiation treatment.

11. The method for manufacturing a liquid crystal display device, according to claim 7, wherein the light irradiation treatment is performed so that a surface of the liquid crystal layer is irradiated from an oblique direction.

12. The method for manufacturing a liquid crystal display device, according to claim 8, wherein the light irradiation treatment is performed so that a surface of the liquid crystal layer is irradiated from an oblique direction.

13. The method for manufacturing a liquid crystal display device, according to claim 7, wherein a plurality of lights supplying different energies is used in the light irradiation treatment, and wherein the liquid crystal layer is irradiated with the plurality of lights in the order of increasing energy, starting from light which supplies the lowest energy to the liquid crystal layer.

14. The method for manufacturing a liquid crystal display device, according to claim 8, wherein a plurality of lights supplying different energies is used in the light irradiation treatment, and wherein the liquid crystal layer is irradiated with the plurality of lights in the order of increasing energy, starting from light which supplies the lowest energy to the liquid crystal layer.

15. The method for manufacturing a liquid crystal display device, according to claim 7, wherein the liquid crystal layer is irradiated with light both from the first substrate side and from the second substrate side in the light irradiation treatment.

16. The method for manufacturing a liquid crystal display device, according to claim 8, wherein the liquid crystal layer is irradiated with light both from the first substrate side and from the second substrate side in the light irradiation treatment.

17. The method for manufacturing a liquid crystal display device, according to claim 7, wherein light used for the light irradiation treatment is processed into a linear shape in an irradiation region of the liquid crystal layer.

18. The method for manufacturing a liquid crystal display device, according to claim 8, wherein light used for the light irradiation treatment is processed into a linear shape in an irradiation region of the liquid crystal layer.

* * * * *